(12) United States Patent
Brune et al.

(10) Patent No.: US 7,898,494 B2
(45) Date of Patent: Mar. 1, 2011

(54) LOCATING TECHNIQUE AND APPARATUS USING AN APPROXIMATED DIPOLE SIGNAL

(75) Inventors: Guenter W. Brune, Bellevue, WA (US); John E. Mercer, Kent, WA (US); Albert W. Chau, Woodinville, WA (US); Rudolf Zeller, Seattle, WA (US)

(73) Assignee: Merlin Technology, Inc., Renton, WA (US)

(*) Notice: Subject to any disclaimer, the term of this patent is extended or adjusted under 35 U.S.C. 154(b) by 333 days.

(21) Appl. No.: 12/240,484

(22) Filed: Sep. 29, 2008

(65) Prior Publication Data

US 2009/0027055 A1 Jan. 29, 2009

Related U.S. Application Data

(63) Continuation of application No. 11/688,226, filed on Mar. 19, 2007, now Pat. No. 7,443,359, which is a continuation of application No. 11/168,108, filed on Jun. 27, 2005, now Pat. No. 7,209,093, which is a continuation of application No. 10/097,224, filed on Mar. 12, 2002, now Pat. No. 6,927,741.

(60) Provisional application No. 60/332,257, filed on Nov. 15, 2001.

(51) Int. Cl.
*H01Q 21/00* (2006.01)
*G01V 3/18* (2006.01)

(52) U.S. Cl. ......... 343/866; 343/742; 343/867; 324/334; 324/338

(58) Field of Classification Search .................. 343/741, 343/742, 866, 867; 324/207, 323, 334, 338, 324/346
See application file for complete search history.

(56) References Cited

U.S. PATENT DOCUMENTS

| | | | |
|---|---|---|---|
| 3,529,682 A | 9/1970 | Coyne et al. | |
| 3,712,391 A | 1/1973 | Coyne | |
| 4,290,020 A | 9/1981 | Hansen et al. | |
| 4,393,350 A | 7/1983 | Hansen et al. | |
| 4,710,708 A | 12/1987 | Rorden et al. | |
| 5,212,495 A | 5/1993 | Winkel et al. | |
| 5,339,037 A * | 8/1994 | Bonner et al. | 324/366 |
| 5,485,089 A | 1/1996 | Kuckes | |
| 5,892,361 A | 4/1999 | Meyer et al. | |
| 5,966,013 A | 10/1999 | Hagiwara | |

(Continued)

OTHER PUBLICATIONS

Sperry-Sun, Improve Recovery of Your Heavy Oil Reserves, Jan. 1997, Sperry-Sun, Sperry-Sun Promotional Brochure.

*Primary Examiner* — Tan Ho
(74) *Attorney, Agent, or Firm* — Pritzkau Patent Group, LLC

(57) ABSTRACT

Location determination is performed using a transmitter including an elongated generally planar loop antenna defining an elongation axis. The elongation axis is positioned along at least a portion of a path. A magnetic field is then generated which approximates a dipole field. Certain characteristics of the magnetic field are then determined at a receiving position radially displaced from the antenna elongation axis. Using the determined certain characteristics, at least one orientation parameter is established which characterizes a positional relationship between the receiving position and the antenna on the path. The magnetic field may be transmitted as a monotone single phase signal. The orientation parameter may be a radial offset and/or an angular orientation between the receiving position and the antenna on the path. The antenna of the transmitter may be inserted into a first borehole to transmit the magnetic field to a receiver inserted into a second borehole.

12 Claims, 11 Drawing Sheets

U.S. PATENT DOCUMENTS

| | | |
|---|---|---|
| 6,047,783 A | 4/2000 | Mercer et al. |
| 6,088,294 A * | 7/2000 | Leggett et al. ............... 367/25 |
| 6,223,826 B1 | 5/2001 | Chau et al. |
| 6,315,062 B1 | 11/2001 | Alft et al. |
| 6,417,666 B1 | 7/2002 | Mercer |
| 6,536,538 B2 | 3/2003 | Brune et al. |
| 6,563,314 B1 | 5/2003 | Klienberg |
| 6,854,535 B1 | 2/2005 | Mizuno |
| 6,927,741 B2 | 8/2005 | Brune et al. |
| 7,182,151 B2 * | 2/2007 | Stump et al. ............... 175/45 |
| 7,209,093 B2 | 4/2007 | Brune et al. |
| 2007/0084635 A1 | 4/2007 | Burrows et al. |

* cited by examiner

LOCATING TECHNIQUE AND APPARATUS USING AN APPROXIMATED DIPOLE SIGNAL

RELATED APPLICATION

This is a continuation application of prior application Ser. No. 11/688,226, filed on Mar. 19, 2007 now U.S. Pat. No. 7,443,359, which is a continuation of application Ser. No. 11/168,108, filed on Jun. 27, 2005 and issued as U.S. Pat. No. 7,209,093 on Apr. 24, 2007; which is a continuation of application Ser. No. 10/097,224, filed on Mar. 12, 2002 and issued as U.S. Pat. No. 6,927,741 on Aug. 9, 2005; the disclosures of which are incorporated herein by reference. The present application also claims priority from U.S. Provisional Application Ser. No. 60/332,257, filed on Nov. 15, 2001.

BACKGROUND OF THE INVENTION

The present invention is related generally to the field of locating using an electromagnetic signal and, more particularly, to locating relative to a path using an electromagnetic locating signal. The apparatus and method of the present invention are highly advantageous with regard to determination of orientation relative to a target borehole, for example, in an operation intended to form another borehole arranged having a particular orientation with respect to the target borehole.

A number of approaches have been taken in the prior art with regard to locating relative to a path using an electromagnetic locating signal. The predominant application has been seen in the field of underground locating for the purpose of forming a borehole that is parallel, at some desired offset, from a pre-existing borehole. Such parallel boreholes are generally used for the purpose of enhancing extraction of heavy oil reserves. The pair of boreholes includes at least one horizontally spaced-apart section positioned to extend through the heavy oil reserve. Steam is generally injected into one of the parallel pair of boreholes forming an uppermost portion of the horizontally extending section serving to heat and thin the oil surrounding it. The other borehole comprises a lowermost portion of the horizontally extending section which receives the heated and thinned oil for recovery.

One approach to the problem of forming a borehole, that is drilled in relation to an existing, target borehole (itself defining a path for locating relative thereto) is seen in a family of patents issued to Kuckes et al. including, as an example, U.S. Pat. No. 5,485,089. A common feature throughout these patents resides in the use of a "solenoid" to transmit a point source, dipole locating signal from the target borehole which varies in three dimensions emanating from the point source. As will be described below, this feature is considered as being disadvantageous based on signal decay characteristics and in view of further discoveries that are brought to light herein.

A more general approach for use in guiding a drilling operation is seen in U.S. Pat. Nos. 3,529,682 and 3,712,391 issued to Coyne (hereinafter the Coyne patents). These patents describe a guidance system for guiding a mole, for example, a drill head, with respect to a pair of antennas that is laid out on the ground. While the Coyne patents describe an elongated axis antenna capable of being positioned along a path, the advantages of the Coyne patents are inextricably founded upon the use of a rotating magnetic field detector received at the location of the mole. This relatively complex field vector is produced using a dipole-quadrupole antenna that is actually made up of two separate antennas. Specifically, what the '391 patent describes as a dipole antenna is a wire loop which itself surrounds a quadrupole antenna. This antenna pair must be driven in a specialized manner to produce the desired field characteristic. As a first example, each one of the pair of antennas is driven by a separate, out-of-phase signal. As a second example, the antenna pair may be driven with two distinct frequencies or with at least some sort of identifiable timed variation between the two signals that drive the two antennas. In any case, the rotating field vector must be produced.

While the disclosure of the '391 patent states that any suitable antenna may be used to produce a preferred, circularly polarized locating signal, the disclosure favors the use of these two antennas, in combination, for reasons of its "simple geometric relationships" (col. 2, ln. 6-7). As will be further described at an appropriate point hereinafter, the use of a rotating flux vector is considered as unduly complex and burdensome in light of the teachings of the present invention.

The present invention resolves the foregoing disadvantages and difficulties while providing still further advantages, as will be described below.

SUMMARY OF THE INVENTION

As will be described in more detail hereinafter, there are disclosed herein apparatus and an associated method for tracking and/or steering relative to a path using an electromagnetic locating signal.

In one aspect of the present invention, location determination is performed using a transmitter configured having an elongated generally planar loop antenna defining an elongation axis. The elongation axis of the antenna is positioned along at least a portion of a path. A magnetic field is then generated from the antenna. Certain characteristics of the magnetic field are then determined at a receiving position radially displaced from the antenna elongation axis. Using the determined certain characteristics, at least one orientation parameter is established which characterizes a positional relationship between the receiving position and the antenna on the path. In one feature, the magnetic field is transmitted as a monotone single phase signal. In another feature, the orientation parameter may be selected as at least one of a radial offset and an angular orientation between the receiving position and the antenna on the path. In still another feature, the elongated generally planar loop antenna includes a single, planar current loop. In yet another feature, at least the antenna of the transmitter is inserted into a first, reference borehole to transmit the magnetic field from within the reference borehole. A receiver is configured for insertion into a second, drill borehole. Positional determinations that are made by the system therefore indicate the positional orientation of the drill borehole relative to the reference borehole. In an additional feature, the elongated planar loop antenna may be positioned along any path, including one defined at the surface of the ground, for the purpose of forming a borehole having a particular orientation with respect to the defined path.

In another aspect of the present invention, in which a second borehole is formed by a drill head that is moved by a drill string that is made up of a plurality of removably attachable drill pipe sections each of which includes a section length, a receiver is positioned to move along with the drill head. A planar loop antenna is configured having an antenna length along an elongation axis that is sufficiently long to produce an approximate two-dimensional dipole locating signal over a length of the reference borehole and, therefore, also at the receiver in the drill borehole corresponding to at least the section length. End effects are produced by opposing end segments at either end of the antenna length. A pipe section is added to the drill string for thereafter advancing the drill head and receiver by approximately one section length. The loop antenna is then advanced in the reference borehole until the end effects are measured or detected at the receiver, indicating that a rearward one of the antenna end segments is generally aligned with the receiver. Responsive to detection of the end effects, the loop transmitter is withdrawn until the approximate dipole locating signal is detected at the receiver. The receiver may then be advanced by at least one section length through the approximate dipole field. In one feature, the receiver and drill head are advanced by successive section lengths along an overall path which is longer than the section length as the loop transmitter is incrementally advanced by approximately at least one section length at a time.

In a continuing aspect of the present invention, electromagnetic location determination is performed by configuring a transmitter to include an elongated planar loop antenna defining an elongation axis. At least the planar loop antenna is inserted into a first borehole to at least generally align the elongation axis of the antenna with at least a lengthwise portion of the first borehole. A magnetic field is generated from the elongated planar antenna of the transmitter. A receiver is positioned in a second borehole that is formed at least radially displaced from the first borehole. Certain characteristics of the magnetic field are then determined using the receiver in the second borehole. Using the determined certain characteristics, at least one of a radial offset and an angular orientation are established between the receiver in the second borehole and the elongation axis of the elongated planar loop antenna in the first borehole.

In still another aspect of the present invention, position determination is accomplished relative to a reference borehole having an inner diameter by configuring a transmitter to include an elongated planar loop antenna having a current loop including a pair of end segments with a length therebetween defining an elongation axis. The length is greater than the inner diameter of the reference borehole. At least the antenna is inserted into the reference borehole to at least generally align the elongation axis along at least a portion of the reference borehole. A magnetic field is generated from the current loop of the antenna within the reference borehole. Certain characteristics of the magnetic field are sensed at a receiving position that is radially displaced from the reference borehole. Using the sensed or measured certain characteristics, at least one of a radial offset and an angular orientation is determined between the receiving position and the antenna elongation axis of the antenna in the reference borehole.

In a further aspect of the present invention, location determination is carried forth by configuring a transmitter to include an antenna having a current loop with opposing end segments and having a length therebetween defining an elongation axis. The elongation axis of the antenna is positioned along at least a portion of a path. The current loop is twisted along its length with a roll angle difference between the end segments, which roll angle difference is less than a full circle (360 degrees). The roll angle difference is detected using at least one roll sensor positioned to roll with at least a portion of the current loop. A magnetic field is generated from the current loop. Certain characteristics of the magnetic field are determined at a receiving position that is radially displaced from the antenna elongation axis. Using the determined certain characteristics and the detected roll angle difference, at least one of a radial offset and an angular orientation are established characterizing the receiving position relative to the antenna on the path.

In an additional aspect of the present invention, electromagnetic location determination is performed by configuring a transmitter to include an elongated planar loop antenna having first and second planar current loops each of which defines an elongation axis that is also common to both of the current loops and orienting the first and second current loops at a predetermined angle relative to one another. The elongation axis of the antenna is positioned along at least a portion of a path. A magnetic signal is generated from at least a selected one of the first and second current loops using the transmitter. Certain characteristics of the magnetic signal are measured at a receiving position that is radially displaced from the elongation axis. Using the measured certain characteristics, at least one of a distance offset and an angular orientation is determined between the receiving position and the antenna on the path.

In another aspect of the present invention, electromagnetic location determination is performed by configuring a transmitter to include an elongated planar loop antenna having at least first and second planar current loops arranged side-by-side to cooperatively and individually define an elongation axis; the current loops being at least approximately coplanar with respect to one another. The elongation axis of the antenna is positioned along at least a portion of a path. A magnetic signal is generated from at least a selected one of the first and second current loops of the transmitter. Certain characteristics of the magnetic signal are measured at a receiving position radially displaced from the antenna elongation axis. Using the measured certain characteristics, at least one of (i) a distance offset between the receiving position and the elongation axis, (ii) an angular orientation between the receiving position and the elongation axis, and (iii) a projection of the receiving position onto the elongation axis is determined. In one feature, the first current loop is configured for generating a generally localized magnetic signal spike for use in determining the projection of the receiving position while the second current loop is configured having an elongated length to generate an elongated portion of the magnetic field to approximate a dipole field in any plane generally transverse to the elongation axis, which elongated portion of the magnetic field is approximately constant with movement parallel to the elongation axis at least for use in the distance offset and angular orientation determinations. In another feature, the antenna length is greater than a radial distance between the antenna elongation axis and the receiving position.

In still another aspect of the present invention, a transmitter is disclosed for use in transmitting a magnetic signal from within a borehole having an inner diameter. The transmitter includes an elongated planar loop antenna having at least one current loop defining an elongation axis such that an elongated length of the current loop along the elongation axis is greater than the inner diameter of the borehole and a width of the planar loop antenna is less than the inner diameter of the borehole to provide for inserting at least the current loop in the borehole, thereby receiving the planar loop antenna in a section of the borehole with the elongation axis generally aligned at least with that section of the borehole. Drive means energizes the planar loop antenna to emanate a magnetic field from within the borehole such that the magnetic field is measurable at a receiving position radially displaced from the antenna elongation axis for use in determining at least one of (i) a radial offset distance between the receiving position and the elongation axis, (ii) an angular orientation between the receiving position and the elongation axis, and (iii) a projection of the receiving position onto the elongation axis. In one feature, the current loop is made up of a pair of opposing end segments with a center section extending therebetween to define the elongated length. The center section advantageously emits the magnetic field in a way which at least approximates a two-dimensional dipole magnetic field in any plane that is generally transverse to the center section.

In yet another aspect of the present invention, location determination is performed by configuring a transmitter to include an elongated planar loop antenna defining an elongation axis. The elongation axis of the antenna is positioned along at least a portion of a path for generating a magnetic field from the antenna. A receiver is configured to include a pair of spaced-apart sensors cooperatively defining a receiving axis for detecting the magnetic field. Certain characteristics of the magnetic field are measured using the receiver at a receiving position that is radially displaced from the antenna elongation axis. Using the measured certain characteristics, at least a yaw value between the elongation axis of the antenna and the receiving axis of the receiver is determined. In one feature, the planar loop antenna is positioned within a reference borehole such that the elongation axis of the planar loop antenna is generally aligned with at least a section of the reference borehole defining the portion of the path to produce the magnetic field from within the reference borehole. For measuring the magnetic field, the receiver is positioned in a different borehole such that the receiving axis defined by the pair of spaced-apart sensors is generally aligned with at least a section of the different borehole. By using the measured characteristics, at least the yaw value of the different borehole is determined in relation to the reference borehole.

In a further aspect of the present invention, an apparatus for location determination is disclosed. The apparatus includes a transmitter including an elongated planar loop antenna defining an elongation axis configured for positioning the elongation axis of the antenna generally along at least a portion of a path while generating a magnetic field from the antenna. The antenna includes opposing end segments and an antenna length therebetween such that the magnetic field measured in any plane generally transverse to the elongation axis along the antenna length and sufficiently inward from the end segments includes a flux characteristic generally approximating a dipole locating signal. Receiving means measures a characteristic of the magnetic field at a receiving position radially displaced from the antenna length. Processing means uses the measured signal strength in determining at least one of an angular orientation and a radial offset of the receiving position relative to the antenna position based, at least in part, on the flux characteristic of the magnetic field.

In another aspect of the present invention, an apparatus for position determination is described. The apparatus includes a transmitter having an elongated planar loop antenna defining an elongation axis configured for positioning the elongation axis of the antenna generally along at least a portion of a path while generating a magnetic field from the antenna. The antenna includes opposing end segments and an antenna length therebetween such that the magnetic field measured in any plane generally transverse to the elongation axis along the antenna length and sufficiently inward from the end segments includes a flux characteristic generally approximating a dipole locating signal having a signal strength that is substantially constant at any fixed angular orientation and fixed offset along the antenna length. Monitoring means includes receiving means for measuring the signal strength of the magnetic field at a receiving position radially displaced from the antenna length and processing means for tracking at least one of angular orientation and offset of the receiving position with movement thereof as projected onto the antenna length based, at least in part, on the flux characteristic of the magnetic field.

In another aspect of the present invention, location determination is accomplished by generating a magnetic field from an antenna arranged along a path such that the magnetic field includes a flux vector having a constant vectorial orientation along any pathway that is parallel to a particular section of the path and which constant vectorial orientation varies with rotational movement about the particular section at any constant radius therefrom. The flux vector is tracked during movement proximate to the particular section of the path to define a new path. In one feature, the flux having a constant vectorial orientation along any pathway that is parallel to a particular section of the path further includes a constant intensity along the parallel pathway.

In a continuing aspect of the present invention, a receiver is disclosed for use in an overall apparatus for location determination. The receiver includes an arrangement for detecting certain characteristics of a magnetic field that approximates a dipole signal in two dimensions, as emanated from a transmission axis, and for measuring certain characteristics of the magnetic field using the receiver at a receiving position radially displaced from the transmission axis. Processing means, forming part of the receiver, uses the measured certain characteristics to determine an orientation parameter which characterizes the receiving position relative to the transmission axis.

In still another aspect of the present invention, a receiver is disclosed for use in an overall apparatus for location determination. The receiver includes a pair of spaced-apart sensors cooperatively defining a receiving axis for detecting certain characteristics of a magnetic field that approximates a dipole signal in two dimensions, as emanated from a transmission axis, and for measuring certain characteristics of the magnetic field using the receiver at a receiving position radially displaced from the transmission axis. Processing means forms part of the receiver for using the measured certain characteristics to determine at least a yaw value between the transmission axis and the receiving axis of the receiver.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
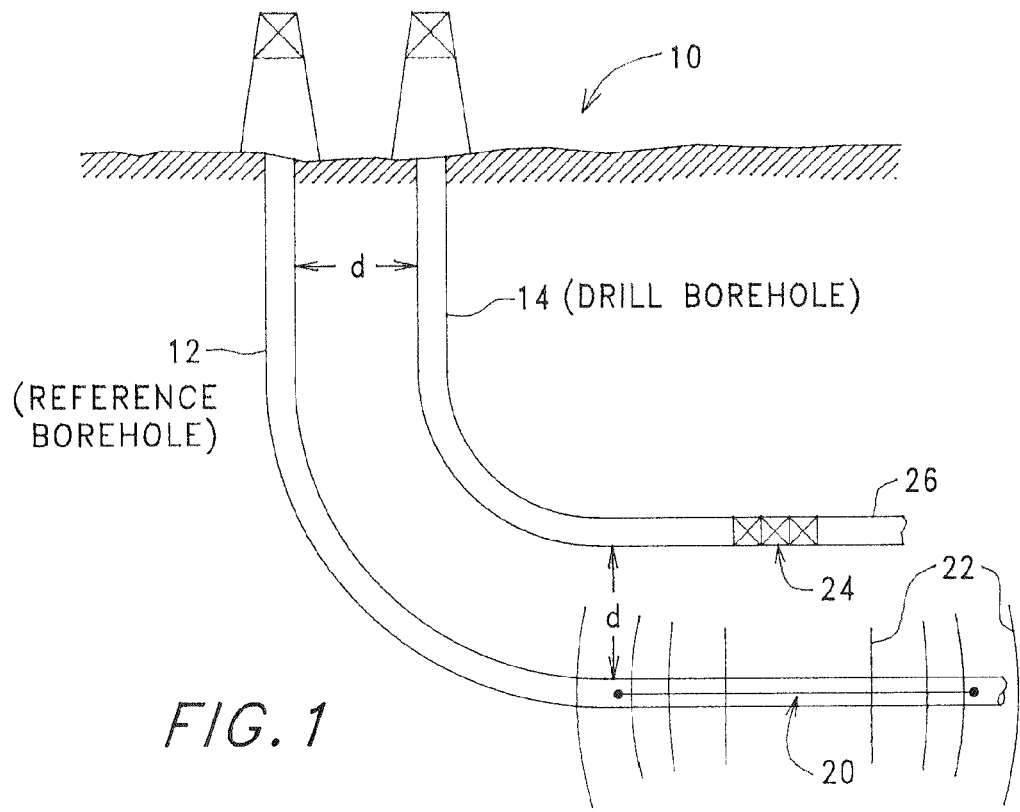
FIG. 1 is a diagrammatic view in elevation of a locating and steering apparatus of the present invention in an implementation for forming a borehole that is parallel to a path such as is defined here by a preexisting borehole.

Turning now to the figures, wherein like reference numbers are used throughout the various figures to refer to like components, attention is immediately directed to FIG. 1 which illustrates a tracking and guidance system, generally indicated by the reference numeral 10, operating in first and second boreholes 12 and 14, respectively. It should be appreciated that FIG. 1 generally illustrates an operation wherein second borehole or well 14 is being drilled parallel to and above first borehole or well 12. Such wells formed having horizontally-extending, parallel sections are useful in certain types of resource extraction, as briefly described above. In particular, these wells are used in Steam Assisted Gravity Drainage (SAGD)™ operation. The present invention is well suited as an adjunct to SAGD for producing oil from heavy reserves such as from tar sand reservoirs during which steam is injected (not shown) into completed borehole 14 and, thereby, its surrounding tar sand to reduce the viscosity of the reserves which then flow into lower borehole 12 assisted by gravity, steam pressure and reservoir pressure. Frequently, first, lower production borehole 12 is initially formed with second, injection borehole 14 subsequently formed parallel at least to the horizontally extending section. In order to obtain a high oil recovery rate, the upper bore must be accurately positioned above the lower one with little lateral offset and at a predetermined optimum distance. As will be seen, the present invention is highly advantageous in providing the capability to form a parallel borehole proximate to the length of a pre-existing borehole or path.

Throughout the present disclosure and appended claims, the completed borehole, which may either be the upper or lower well (as defined by the horizontally extending well sections), is termed the "reference" borehole or well whereas the bore that is being drilled utilizing the disclosed technique is termed the "drill" borehole or well. Equipment and methods suitable for accurately positioning the drill well are described at appropriate points hereinafter.

Prior to discussing details regarding the use of the present invention in the specific context of borehole formation, it is important to understand that the present invention enjoys a wide range of applicability and is in no way limited to the formation of parallel boreholes as needed in SAGD.

Specifically, the present invention may be used in virtually any locating/tracking scenario wherein an elongated antenna is positionable along a path. For example, the path may be defined on the surface of the ground or below the surface in any sort of cavity such that the antenna to be described need not be specifically tailored to the dimensions of the cavity.

The term "borehole", as used in the specification and in the claims, is considered to encompass any underground pathway or inground cavity whether pre-existing or undergoing drilling.

Similarly, a receiver, for detecting the signal emitted by the antenna, need not be positioned within a borehole. The present invention contemplates a receiver in any suitable form including, for example, a portable locator configured for defining a path having a desired relationship to the path along which the antenna is arranged. Conversely, a transmitter, for emitting a signal to be detected, also need not be positioned within a borehole. The present invention contemplates a transmitter in any suitable form including, for example, a transmitter deployed above-ground to be used in conjunction with a below-ground receiver. For purposes of clarity and brevity, however, the remaining discussions consider the application of the present invention in a borehole environment. This discussion is in no way intended to narrow the scope of the invention which is defined, in part, by the appended claims. It is considered that one of ordinary skill in the art may readily adapt the present invention to a wide array of alternative applications, in view of the teachings herein, which clearly fall within the scope of at least the appended claims.

Still referring to FIG. 1, a loop transmitter 20, designed in accordance with the present invention, is inserted into reference well 12 positioned within its horizontally extending section. During operation, loop transmitter 20 may be moved within the casing of borehole 12 in any suitable manner such as, for example, by mud pressure, cable, or some other vehicle. The loop transmitter includes an electronics section (not shown) which may be positioned down-hole or at the surface in electrical communication with a down hole antenna using a suitable communications link with the surface. Such communications may be accomplished, for example, by wire link, electromagnetic link or conventional mud pulsing triggered by a signal from the surface such as the rate of mud flow or pulsing. The configuration of the antenna remains essentially the same irrespective of the location of the driving electronics package and/or the type of communications link. The present application considers that one having ordinary skill in the art is capable of configuring this electronics package in view of the teachings herein. One highly advantageous apparatus for maintaining through-the-pipe electrical communication is described in U.S. Pat. No. 6,223,826 entitled AUTO-EXTENDING/RETRACTING ELECTRICALLY ISOLATED CONDUCTORS IN A SEGMENTED DRILL STRING and co-pending U.S. application Ser. Nos. 09/793, 056 and 09/954,573, all of which are commonly assigned with the present application and incorporated herein by reference. Loop transmitter 20 produces a magnetic locating signal or field 22 (only partially illustrated) having characteristics that are described in detail at appropriate points below. Magnetic field 22 is measured by a receiver assembly 24, which may be referred to as a Down Hole Assembly (DHA), that may be positioned behind a drill head 26 in the instance of guiding the drill head during formation of the drill well.

Figure 2:
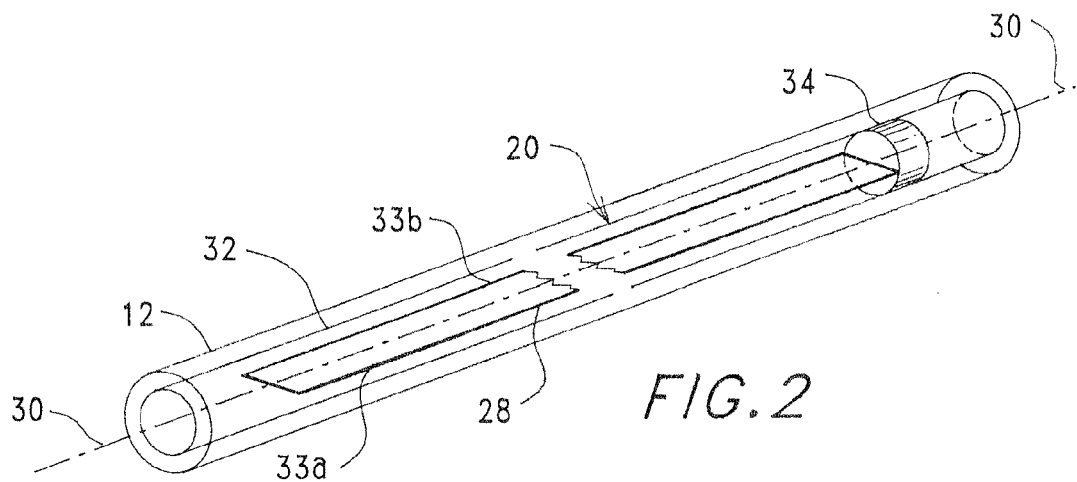
FIG. 2 is a diagrammatic illustration, in perspective, of one implementation of an elongated planar loop transmitter produced in accordance with the present invention and inserted into a section of a reference borehole.

Referring now to FIG. 2 in conjunction with FIG. 1, attention is now directed to details of one embodiment of loop transmitter 20. In this embodiment, a planar current loop 28 is defined by a single wire filament or by multiple windings so as to be at least generally planar in form. Current loop 28 defines an elongation axis 30 and is mounted on a support structure 32 such as, for example, a non-magnetic pipe or other suitable frame. Purposes to which support structure 32 is directed include: maintaining a desired shape of the current loop, protecting the wire from which the current loop is formed against external damage and avoiding distortion of the magnetic field emitted by signal currents flowing in the current loop. Specific suitable materials for use as support structures include but are not limited to plastics, stainless steel, copper and its alloys.

Current loop 28 of loop transmitter 20 is very long compared with the inner diameter of reference well 12. The length of the current loop along elongation axis 30 is typically fifty to several hundred times of the inner diameter of the well casing. In this regard, it should be appreciated that the figures are not to scale as a result of illustrative constraints. It is also important that the length of the current loop is long compared to a separation "d" between the two boreholes (FIG. 1). For example, a value for d is contemplated as being approximately 10 meters.

In one implementation, loop transmitter 20 is designed to be self-leveling such that the plane of current loop 28 has a tendency to remain in and return to a generally horizontal orientation. That is, a plane taken through a pair of elongated segments 33a and 33b of current loop 28 is self-leveled by this arrangement. In alternative implementations, active control of transmitter 20 may be used to maintain a selected orientation including horizontal or some other roll orientation for purposes which will be brought to light at an appropriate point hereinafter.

In another implementation, loop transmitter 20 may be permitted to twist along the elongated length of current loop 28. If the current loop is allowed to twist in this manner, the antenna should be equipped with one or more roll sensors along its length. To that end, loop transmitter antenna 20 of FIG. 2 includes a sensor package 34 supporting a roll sensor (not shown) within support structure 32. Any number of sensor packages may be so supported at selected locations along the length of current loop 28. The number of roll measurement locations depends at least on torsional stiffness of support structure 32 as well as the effectiveness of any self-leveling apparatus.

Sensor package 34 may support additional instrumentation such as, for example, a pitch sensor for measuring pitch of the down-hole components of the loop transmitter. Since different points may be pitched at different degrees along the generally extensive length of current loop 28 (as controlled by the configuration of the reference borehole), a plurality of pitch sensors (e.g., accelerometers), supported in appropriate sensor packages, may be distributed along the length of the current loop. Alternatively, pitch may be determined from as-build records or surveys of the reference well without the need for pitch sensing.

Figure 3:
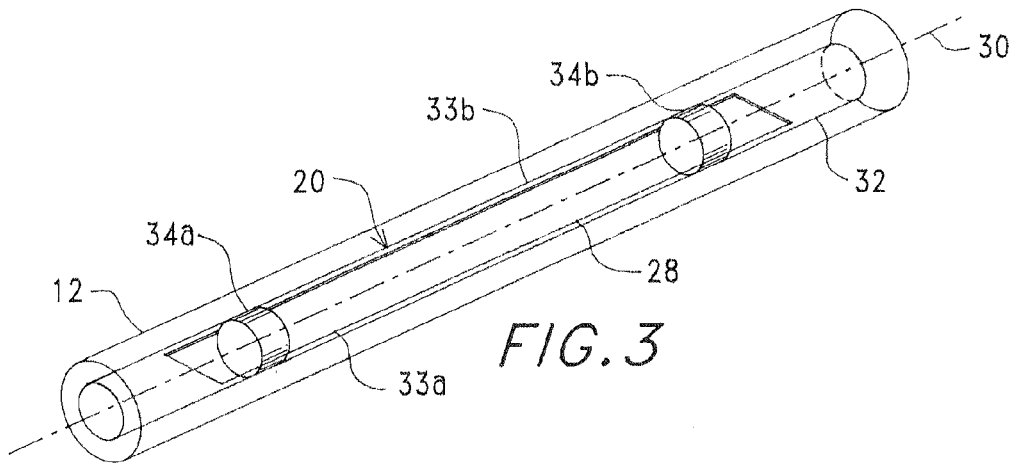
FIG. 3 is a diagrammatic illustration, in perspective, of another implementation of an elongated planar loop transmitter produced in accordance with the present invention and inserted into a section of a reference borehole. In this implementation, a pair of sensor packages are provided.

FIG. 3 illustrates another implementation of loop transmitter 20 in which first and second sensor packages 34a and 34b, respectively, are arranged adjacent the end segments of main current loop 28 within support structure or frame 32 which supports all of these components insertable into borehole 12.

Figure 4:
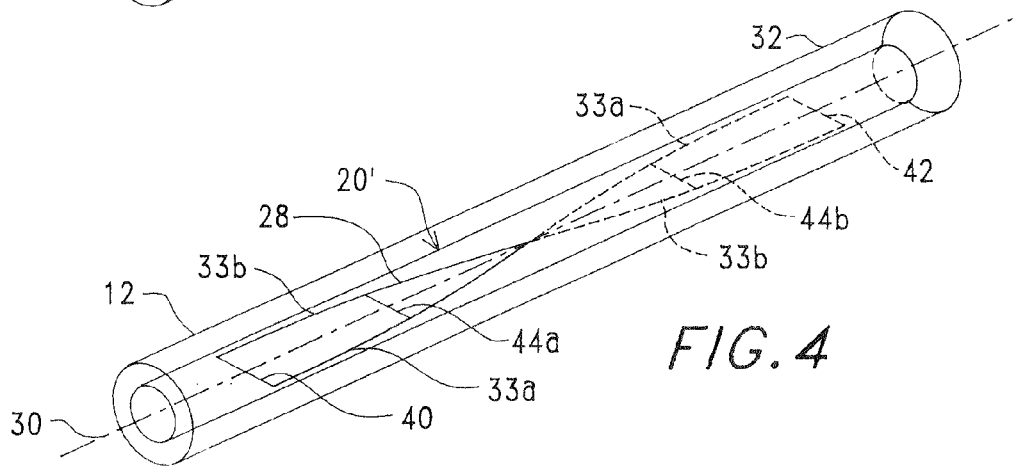
FIG. 4 is a diagrammatic illustration, in perspective, of a variation in the implementation of an elongated planar loop transmitter produced in accordance with the present invention in which a current loop is twisted along its length.

Turning now to FIG. 4, in certain instances, a number of variations of the basic loop transmitter may be advantageous. As a first variation 20', rather than a planar configuration, current loop 28 may be twisted along its length. The total twist in the current loop is defined by a roll angle difference between first and second wire end segments 40 and 42. Less than a full circle of twist is desired. The present example illustrates approximately 180 degrees of twist such that current loop 28 is essentially planar. It should be appreciated that the current loop may be twisted as-built and/or subjected to a potential twist during operational use, as described above, dependent upon the torsional rigidity of support structure 32. Like all of the current loops described herein, the twisted current loop may be made up of any suitable number of individual filament windings. A pair of support stiffeners 44a and 44b are also shown positioned along the elongated length of the current loop at either side of the actual twist. Fluxes induced by a twisted loop transmitter change along its axis due to changes in design twist. Such flux changes can therefore be correlated to longitudinal distance changes, aiding in positioning the transmitter relative to the receiver.

Figure 5:
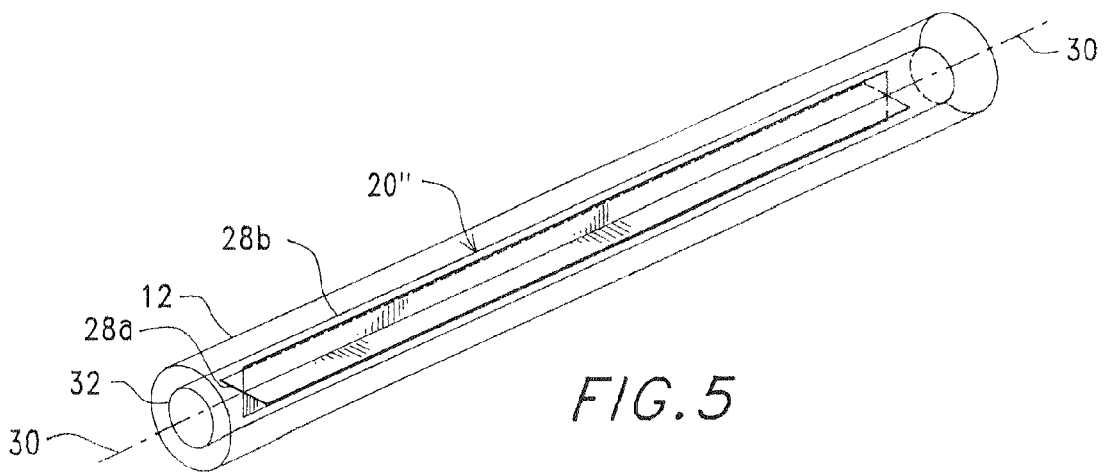
FIG. 5 is a diagrammatic illustration, in perspective, of another variation in the implementation of an elongated planar loop transmitter produced in accordance with the present invention in which a plurality of coplanar current loops are provided in an intersecting arrangement along an elongation axis.

Referring to FIG. 5, a second variation 20" features two or more planar wire loops installed at 90 degrees or some other angle to each other. The present example illustrates first and second current loops 28a and 28b arranged orthogonally with respect to one another along a common elongation axis. Activating the wire loops separately provides two independent sets of flux measurements that improve drill head locating accuracy.

Figure 6:
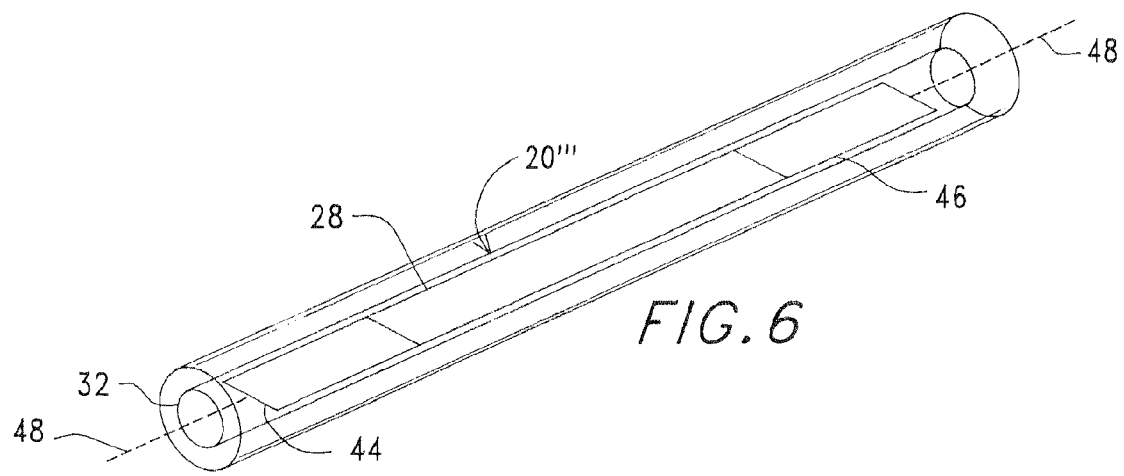
FIG. 6 is a diagrammatic illustration, in perspective, of still another variation in the implementation of an elongated planar loop transmitter produced in accordance with the present invention in which a plurality of coplanar current loops are provided in an arrangement along an elongation axis.

FIG. 6 illustrates a third variation 20''' which is well-suited for drill head locating in the process of parallel borehole formation. In this variation, one or more additional current loops are added to the basic configuration of a single current loop. In the present example, first and second additional current loops 44 and 46, respectively, are arranged in a coplanar manner immediately adjacent to the end segments of current loop 28. Further, the coplanar current loops are generally arranged to define a common elongation axis 48. It is again noted that the figure is not to scale; the main current loop is generally many times longer that the additional current loops.

In variations having two or more current loops, the current loops are driven, for example, using different frequencies, phases, combinations of alternating and direct current, or with signals bearing some sort of distinguishable time relationship. One method to distinguish between non-coplanar wire loops is to use currents of different frequency or time sequencing (for example, time division multiplexed). It is considered that one having ordinary skill in the art is capable of configuring a transmitter to generate such drive signals in view of this overall disclosure.

Figure 7:
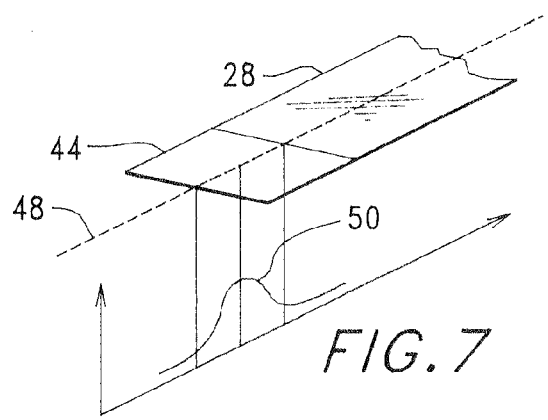
FIG. 7 is a diagrammatic illustration, in perspective, of an end current loop of the elongated planar loop antenna of FIG. 6 shown here to illustrate characteristics of a magnetic field signal spike that is produced by the end current loop.

Referring to FIGS. 6 and 7, multiple coplanar current loops may be used in a number of different ways including, for example, generating magnetic signal spikes to notify a drill operator when the receiver tracking a drill head passes, as orthogonally projected onto the antenna elongation axis. FIG. 7 illustrates first end current loop 44 adjacent to main loop 28 (only partially shown) as well as a magnetic field spike 50 which is formed as part of the total flux emitted by planar loop transmitter 20'''. Therefore, main current loop 28 in FIG. 6 generally includes a length along the elongation axis that is many times that of end current loops or, for that matter, any current loop that is intended to generate a magnetic field spike. In this regard, current loops configured for magnetic field spike generation may be used for purposes other than marking the ends of the main current loop including, for example, marking the center of the main current loop in order to assist in accurately positioning the main current loop. For this particular purpose, a temporary signal may be generated that is distinguishable from end segment signals. An additional use for magnetic field spike generation current loops resides in modifying the main magnetic field of main current loop 28 to partially cancel or modify loop end effects in selected regions. Details with regard to important characteristics of the magnetic field produced by main current loop 28 will be provided at an appropriate point below. For the moment, however, it suffices to note that the main current loop differs from a spike generating loop at least for the reason that the main current loop magnetic field is intended to exhibit constant characteristics along at least a portion of its elongation axis length such that movement parallel to this length results in no appreciable change in the measured magnetic field.

Figure 8A:
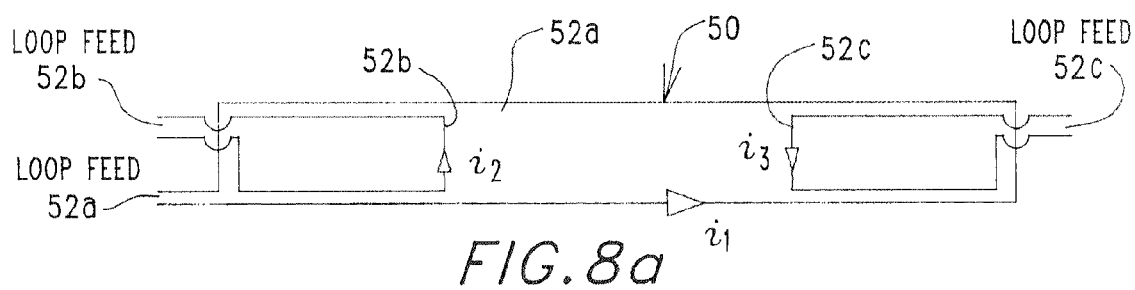
FIG. 8a is a diagrammatic plan view of a first winding configuration for producing the multiple coplanar elongated antenna of the present invention including three current loops wherein each current loop includes a separate loop feed.

FIG. 8a generally illustrates a particular winding configuration of a coplanar multi current loop antenna 50. In this illustration, individual current loops are indicated as 52a, 52b and 52c of which current loops 52b and 52c comprise end current loops while current loop 52a comprises the main current loop. Each current loop may be made up of any suitable number of filament windings. Moreover, each of these current loops is provided with a separate loop feed such that different currents $i_1$, $i_2$ and $i_3$ may be made to flow in each of the current loops 52a, 52b and 52c, respectively, for purposes of distinguishing that portion of the magnetic field emanated by each current loop.

Figure 8B:
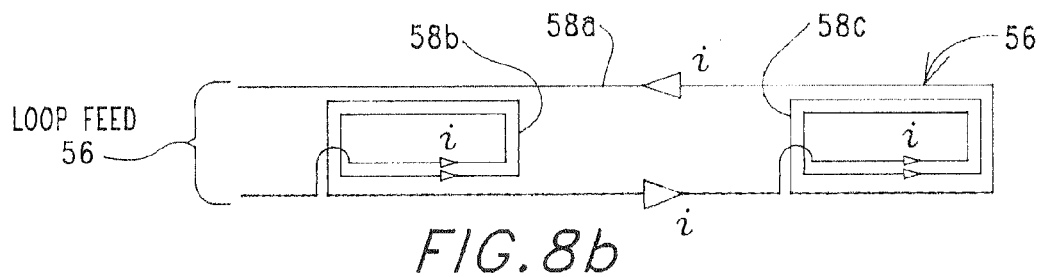
FIG. 8b is a diagrammatic plan view of a second winding configuration for producing the multiple coplanar elongated antenna of the present invention including three current loops and wherein a single feed drives all of the current loops.

FIG. 8b illustrates an alternate method for winding a coplanar multi current loop antenna 56 using a single continuous filament. Therefore, a single loop feed 56 is presented such that a current i flows through all of current loops 58a, 58b and 58c wherein current loop 58a comprises the main loop while loops 58b and 58c comprise end loops. It should be noted that the direction of current i through the end current loops may readily be reversed. Signals emitted by the end current loop may be distinguished by their associated magnetic signal strength spikes.

The elongated planar loop antenna of the present invention is configured with sufficient lateral flexibility so as to be positionable along a curved path such as that defined by a borehole, while still performing its intended function. Field effects resulting from such curvature are discussed below in further detail, but do not contribute to any general difficulties in the application of the present invention with respect to anticipated curvatures.

Figure 9:
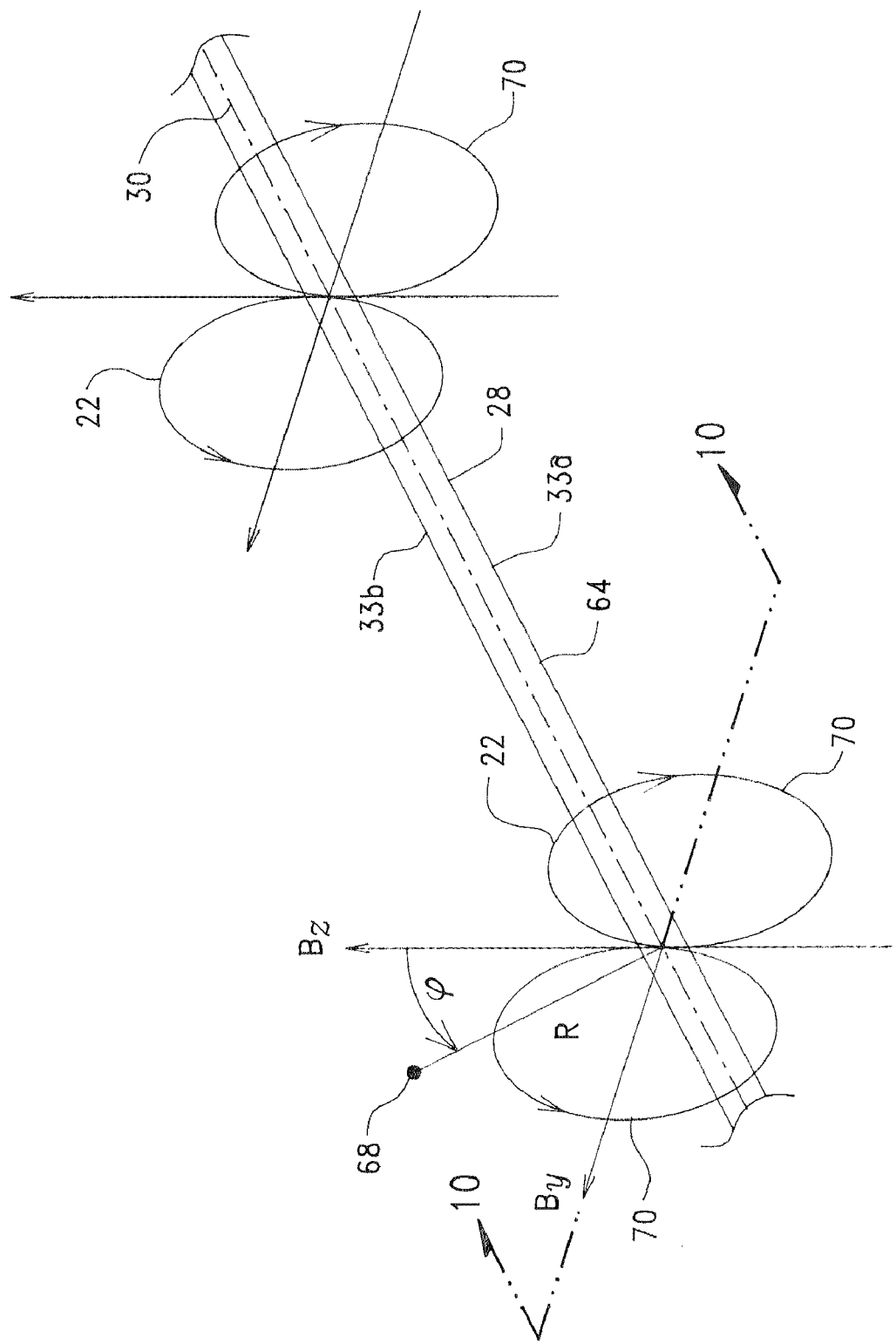
FIG. 9 is a diagrammatic illustration, in perspective, of a section of an elongated planar current loop sufficiently away from its end segments, shown here to illustrate flux characteristics of the magnetic field emanated from the section in a way which approximates a dipole field.

Referring to FIG. 9, attention is now directed to specific details with regard to a portion of magnetic field 22 that is emanated from an illustrated section 64 of planar loop antenna 28. Section 64 of the planar loop antenna is sufficiently away from its end segments to produce at least a portion of magnetic locating field 22 in a way which generates an approximated two-dimensional dipole locating signal 70. In this regard, it should be remembered that single main current loop 28 is long in comparison to its width. Where this transmitter is configured for insertion into a borehole, the width of antenna 28 (including, of course, any sensor packages) is necessarily less that the inner diameter of the reference borehole into which it is to be inserted. Additionally, the elongated length of antenna 28 and its section 64 is greater than a radial separation, R, between a receiving position 68, at which the magnetic field is detected, and section 64 along the elongation axis of the antenna length.

FIG. 9 shows fluxlines of a long current loop in two planes normal to its axis. These fluxlines approximate the fluxlines of an exact two-dimensional dipole near the center of the loop axis. They are slightly different from fluxlines of a two-dimensional dipole since a) the loop is of finite length and b) the distance between segments 33a and 33b is small but nonzero. The approximation improves with increasing length of the current loop and radial distance from the loop axis.

Figure 10:
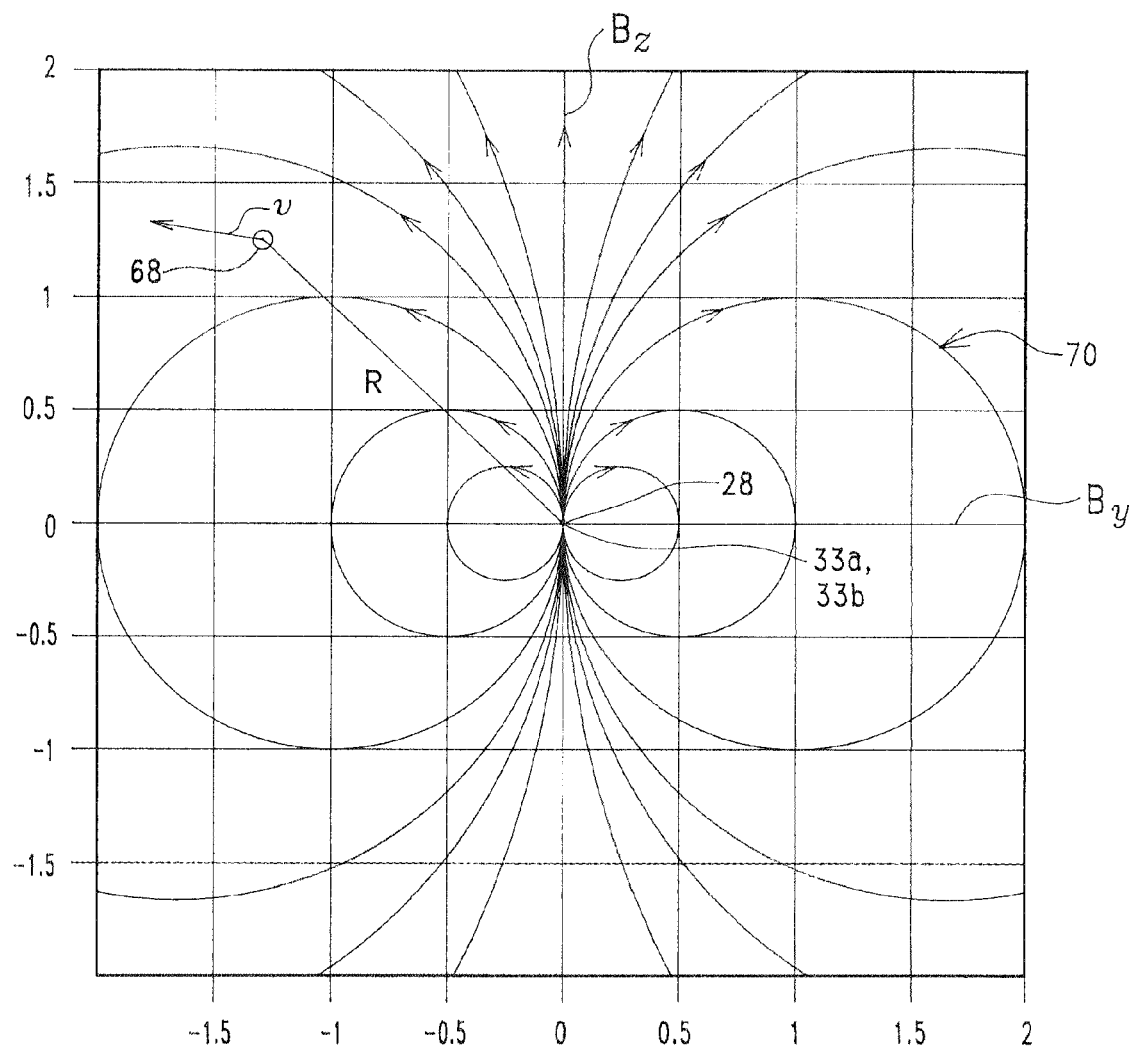
FIG. 10 is a diagrammatic cross-sectional view taken from a line 10-10 in FIG. 9 of the elongated planar loop antenna, shown here to illustrate further details of the approximated dipole field.

FIG. 10 further illustrates a flux vector v located at a receiving position 68 and shows the fluxlines as an exact two-dimensional dipole that results from the current loop by collapsing the distance between line segments 33a and 33b and stretching the length of the loop segments to infinity. For this reason, segments 33a and 33b are indicated as being at the origin of the y and z axes of FIG. 10. It should be noted that these fluxlines are circular. Alternatively, it should be appreciated that an equivalent effect is obtained by viewing or sensing the field from a sufficiently large distance. Flux components are shown in FIG. 9, indicated as $B_y$, within the plane of planar loop antenna 28 and orthogonal to the antenna elongation axis, and $B_z$, normal to the plane of parallel loop antenna 28 and orthogonal to the antenna elongation axis. Locating is performed using the equations of a two-dimensional dipole:

$$B_y = M \frac{\sin 2\varphi}{R^2} \quad (1)$$

$$B_z = M \frac{\cos 2\varphi}{R^2} \quad (2)$$

$$B = \frac{M}{R^2} \quad (3)$$

$$B = \sqrt{B_y^2 + B_z^2} \quad (4)$$

Where M is the dipole strength, B is total signal strength in two dimensions and φ is an angle defined between the $B_z$ axis and a vector of length R extending to receiving position 68 from the elongation axis. Equations 1 and 2 yield orthogonal flux components along the given axes. Equation 3 is the equation for total flux that is seen to have a constant value on circles of radius R around the point of flux origin. Moreover, the equation reveals that the total flux around a two-dimensional dipole decays quadratically with distance from the origin. This is contrary to the characteristics of a three-dimensional dipole where flux decay follows the cubic law. Hence, signal strength coming from a two-dimensional dipole of strength equivalent to that of a three-dimensional dipole is felt over a much larger distance. Equation 4 gives total flux at the receiving position based on the measured orthogonal flux components. Accordingly, for any receiving position within the approximated dipole field, one or both of the angular orientation and the radial offset with respect to the elongation axis may be determined using the following equations.

$$R = \sqrt{\frac{M}{B}} \quad (5)$$

$$\tan 2\varphi = \frac{B_y}{B_z} \quad (6)$$

Referring to FIG. 9, as shown for two positions along section 64 of the antenna elongation axis, the flux relationship in the plane of this figure obtains in any plane taken generally orthogonal to the elongation axis. Accordingly, a constant flux characteristic region is present wherein moving the receiving position along any path that is parallel to section 64 experiences a constant magnetic field characteristic. These constant characteristics include a constant flux vector orientation, as well as a constant flux signal strength. Path tracking, for example using a portable locator, or steering guidance, for example, using a receiver in the drill well can therefore be performed in a highly advantageous way by maintaining constant measured flux characteristics during movement of the receiving position, thereby defining a path that is parallel to the antenna elongation axis. The characteristics that are tracked may include one or both of signal strength and the spatial orientation of the flux vector. Tracking a constant value of either flux vectorial orientation (see orientation vector v in FIG. 10) or signal strength through the approximated dipole field will define a new path that is generally parallel to the elongation axis. Of course, these flux related characteristics may be tracked simultaneously as an enhancement. As mentioned above, the elongated planar loop antenna may be laid out on the surface of the ground for purposes of defining a reference path, rather than positioning the antenna in a reference borehole.

With reference to FIGS. 1, 9 and 10, separation d, between the boreholes, is used as radial offset R in equations 1-4 where the present invention is applied to parallel borehole formation. Distance d between the horizontal section of drill well 14 and the horizontal section of reference well 12 should be much less than the elongated length of planar loop antenna 28 and, preferably less than the length of section 64 which emanates the approximated dipole antenna.

With regard to section 64, its length is determined by factors which include its length ratio with respect to the separation distance d between drill and reference borehole and its length as a multiple of the length of the loop end segments. By following these general constraining factors, it can be assured that the length of each end segment of planar loop antenna 28, which emits portions of magnetic field 22 exhibiting end effects, is as short as possible compared to the length of section 64. The properties of the described quasi-two-dimensional or approximated magnetic dipole field recognized by the present invention are employed in one highly advantageous procedure wherein receiver 24 is moved to a position which projects orthogonally onto approximately the middle of the elongated length of the elongated planar loop antenna in reference borehole 12 such that the magnetic field is most two-dimensional. The drill head may then be advanced until end effects are observed by sensing the magnetic field using receiver 24.

Figure 10A:
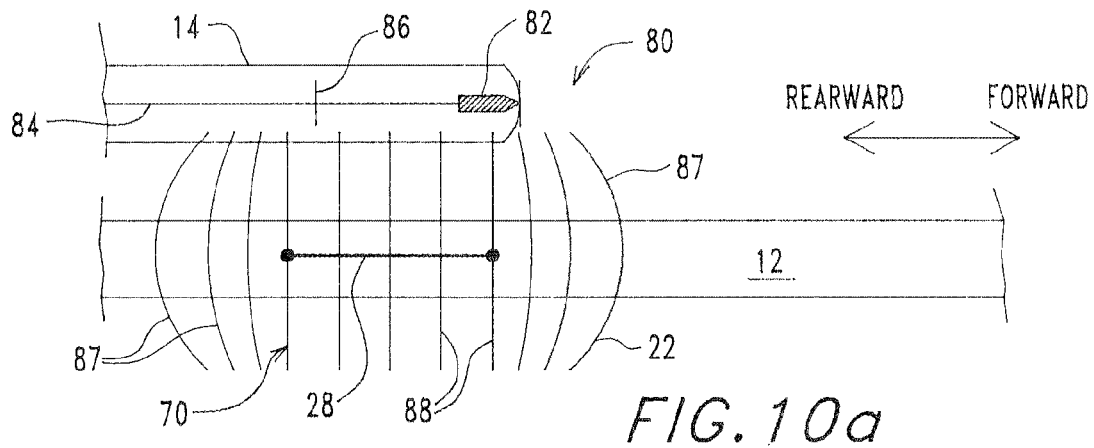
FIGS. 10a-c are diagrammatic illustrations, in elevation, of a reference borehole having a drill borehole being formed parallel thereto, shown here to illustrate progress of a drilling apparatus in the drill borehole by increments of approximately one section length, coordinated with advancing the planar loop antenna within the reference borehole in increments of approximately one section length such that the drilling apparatus moves through incremental sections of the approximated dipole field during formation of the entirety of the drill borehole. For clarity, the illustrations are not shown to scale since the length of the loop antenna should always be larger than the distance between the boreholes.
Figure 10B:
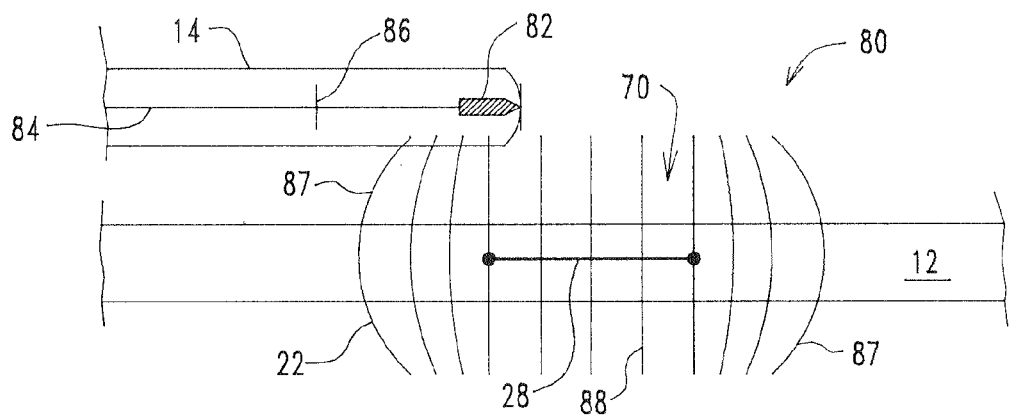
Figure 10C:
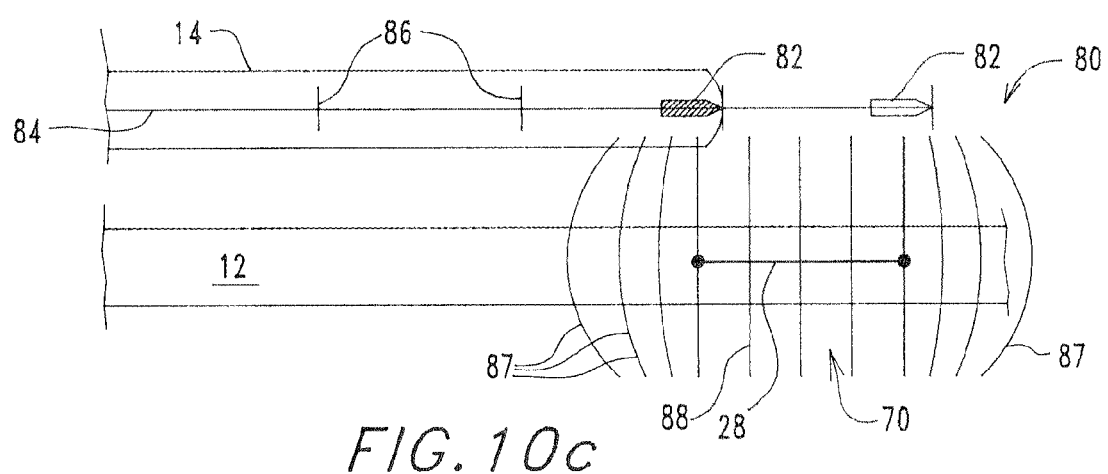

FIGS. 10a-10c collectively illustrate a particularly advantageous implementation of a steering arrangement, which is generally indicated by the reference number 80 and produced in accordance with the present invention. For purposes of this description, parallel horizontal sections of reference borehole 12 and drill borehole 14 are diagrammatically shown by each of these figures during the process of forming the drill borehole. Further, a drilling apparatus 82 is shown that is understood to be made up of the combination of receiver 24 and drill head 26. Steering arrangement 80 includes a segmented drill string 84 for moving drilling apparatus 82. Pipe section breaks in the drill string are indicated by vertical lines 86. Elongated planar loop antenna 28 is diagrammatically shown in reference borehole 12 emanating magnetic field 22. With regard to the latter, end effects are illustrated as curved lines 87 at either end of planar loop antenna 28 having the approximated dipole field located between opposing sets thereof. As is the case in FIG. 1, it should be appreciated that the illustrated shape is not intended to depict the actual configuration of the end effect flux lines, but only to indicate their presence. The actual configuration of constant intensity flux lines is illustrated in a subsequent figure. Straight, vertically oriented lines 88 represent the approximated dipole field. Planar loop antenna 28 is configured having a length such that the approximated dipole field has a useful length along the reference borehole axis that is as long as or longer than an individual drill pipe section.

Referring specifically to FIG. 10a, drilling apparatus 82 is shown having been advanced to a point at which it is about to encounter end effects 87 proximate to a forwardmost end of elongated planar loop antenna 28. This position of the drilling apparatus also represents the drilling apparatus having been advanced by an amount which necessitates the addition of a drill pipe section to the drill string at the drill rig (not shown).

Referring to FIG. 10b in conjunction with FIG. 10a, while a drill pipe section is added to the drill string, planar loop antenna 28 is advanced by one drill pipe section length in reference borehole 12 such that approximated dipole field 70 is again ahead of drilling apparatus 82. The appropriate amount of forward movement of planar loop antenna 28 may readily be detected by advancing the antenna from its FIG. 10a position while drilling apparatus 82 remains stationary. Planar loop antenna 28 is advanced in the reference well until end effects emanated from the rearwardmost end of antenna 28 are observed by sensing the magnetic field using drilling apparatus 82. The antenna is then withdrawn until the received field is again sufficiently two-dimensional, thereby ensuring that the loop is in position for drilling a distance corresponding to the next drill pipe section, as shown in FIG. 10b. In one advantage, this procedure allows real-time data to be processed and continuously sent to the surface. Thereafter, drilling may be performed continuously over the entire length of the next drill pipe section to advance the drill head, without experiencing a significant change in the sensed approximated dipole field.

FIG. 10c illustrates drilling apparatus 82 advanced by one drill pipe section, having passed through the approximated dipole field as illustrated in FIG. 10b. Further, antenna 28 is advanced for drilling over the length of a subsequent drill pipe section. That is, drilling apparatus 82 is positioned just forward of end effects 87 at the rearward end of the planar loop antenna using the procedure described immediately above. Drilling apparatus 82 may then be advanced by one drill pipe section to the position shown in phantom. Drilling may proceed in this highly advantageous manner proximate to the entire length of the reference borehole. One of ordinary skill in the art will recognize that this procedure may be applied to locating and/or guiding relative to any path wherein the length of the elongated planar loop antenna is less than the overall length of the path.

With regard to the foregoing procedure, in the case where data are only taken while the drill pipe is changed, elongated planar loop antenna 28 only need be long enough to ensure that drilling apparatus 82 is in a known magnetic field. To ensure a two-dimensional field is seen by the receiver, one must allow for the greatest positional uncertainty. That is, the loop must be of sufficient length to produce the two-dimensional field over a distance long enough to accommodate any errors associated with the movements of the drill string and the planar loop antenna. One having ordinary skill in the art will readily recognize the utility of multiple coplanar current loops, described above with regard to FIG. 7, for the purpose of producing magnetic signal spikes. The latter may be used in the process of accurately positioning a central elongated planar current loop using readily detectable, localized magnetic signal spikes.

At this juncture, it is appropriate to draw a comparison with the aforedescribed Kuckes patents. The present invention is considered to provide a sweeping improvement over the Kuckes patents. In considering the Kuckes patents, it is important to understand that a three-dimensional dipole locating signal is transmitted. Such a signal decreases in magnitude in an inverse cube relationship with radial distance from the point source of the field. While the locating signal of the present invention approximates characteristics of a dipole field, the signal is transmitted from a line source rather than a point source such that this signal is characterized in two, rather than three dimensions. Hence, along a significant portion of the length of the elongated antenna, the signal exhibits a decrease in magnitude based on an inverse square relationship to distance from the elongation axis of the antenna. This difference, in and by itself, provides a remarkable advantage over the prior art with regard to increasing reception range of the locating signal. In the prior art, doubling the distance between receiver and antenna decreases the signal strength to ⅛. In the present invention, the signal strength is only reduced to ¼. Stated slightly differently, fluxes decrease quadratically with distance from the dipole in each cross-sectional plane. This distinction aids in assuring strong signals for accurate locating and steering, for example, of a drill head parallel to a drill well.

As mentioned, deviations occur in the two-dimensional approximated dipole field at or near the end segments of the planar elongated current loop. These end effects may be calculated based on the law of Biot-Savart and superimposed on the two-dimensional approximated dipole field. An alternate method may be employed in which this law is applied directly to all four linear segments of the elongated current loop to obtain the magnetic field. Knowledge with respect to these end effects is useful for a number of reasons. For example, detection of end effects provides an indication of the relative relationship between a receiving position and either end of the elongated planar loop antenna. As another example, variation in the orientation of the magnetic field flux lines may be viewed along the entire length of the planar elongated current loop. Examples of numerical simulations using the latter, four segment approach are shown in FIGS. 11a-d, as will be further described immediately hereinafter.

Figure 11B:
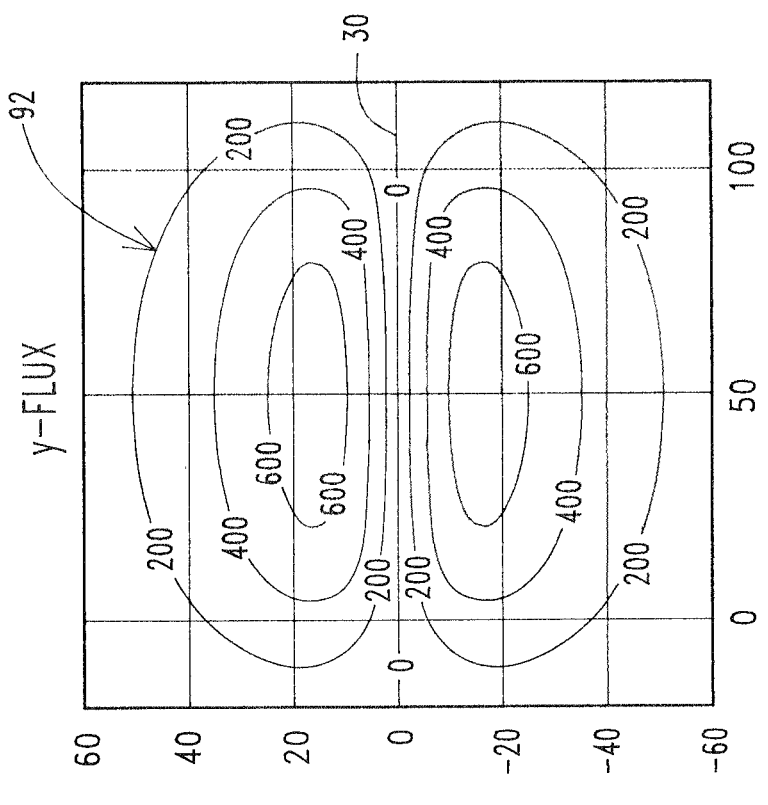
FIG. 11b is a contour plot of flux intensity induced by a single elongated planar current loop antenna at a plane parallel to the plane of the current loop, showing the flux intensity of a flux component that is normal to the elongation axis of the antenna.
Figure 11A:
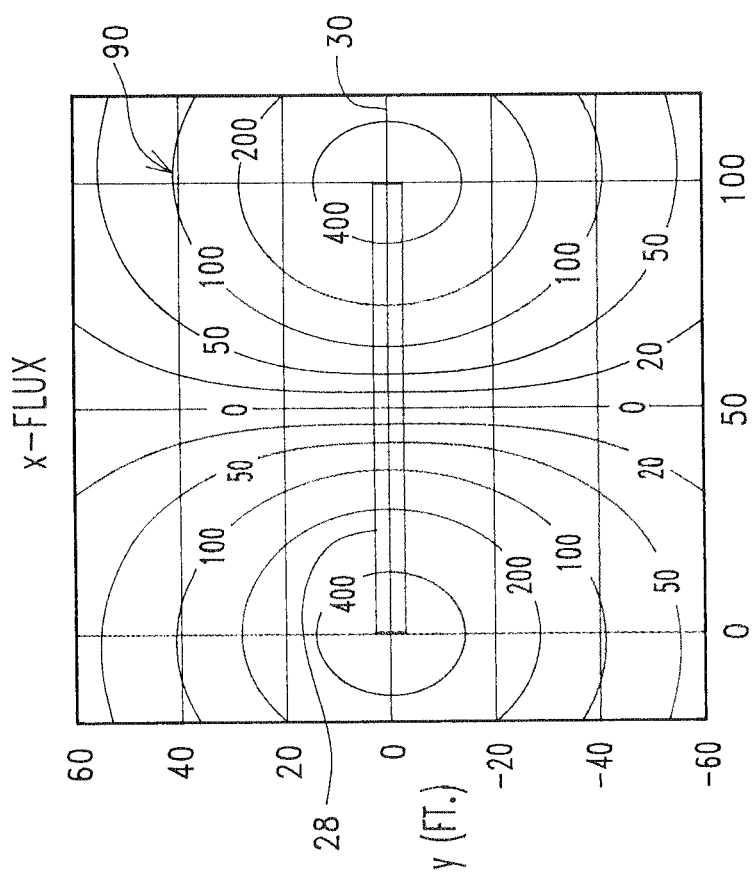
FIG. 11a is a contour plot of flux intensity induced by a single elongated planar current loop antenna at a plane parallel to the plane of the current loop, showing the flux intensity of a flux component that is parallel to the elongation axis of the antenna.

Turning to FIGS. 11a-d, contour plots of fluxes 22 induced by single elongated planar current loop antenna 28 of FIG. 1 are shown in a plane parallel to the plane of the current loop. As seen in FIG. 11a, the current loop is 100 feet long and 0.5 feet wide and is positioned in a horizontal x,y plane arranged along the x axis with the origin of the x axis at one end of the planar loop antenna and with the y axis bisecting the area of the planar loop antenna. The current loop is so positioned for all of FIGS. 11a-d. Additionally, for all of these figures, fluxes are calculated in a plane 30 feet above the current loop by applying the law of Biot-Savart. For clarity, flux values are shown for a dipole strength of $10^6$.

Referring particularly to FIG. 11a, a set of flux contour lines 90 illustrate flux intensity oriented along the x axis. That is, flux intensity oriented parallel to the elongation axis of the planar current loop. It is of interest to note the nearly circular contour lines above the ends of the current loops.

FIG. 11b illustrates a set of flux contour lines 92 based on the flux intensity parallel to the y axis. That is, flux intensity oriented normal to the elongation axis of the planar current loop. Above a centered section of the loop antenna, contour lines 92 are generally straight, representative of a two-dimensional field. Loop end segments are responsible for deviations from this pattern.

Figure 11D:
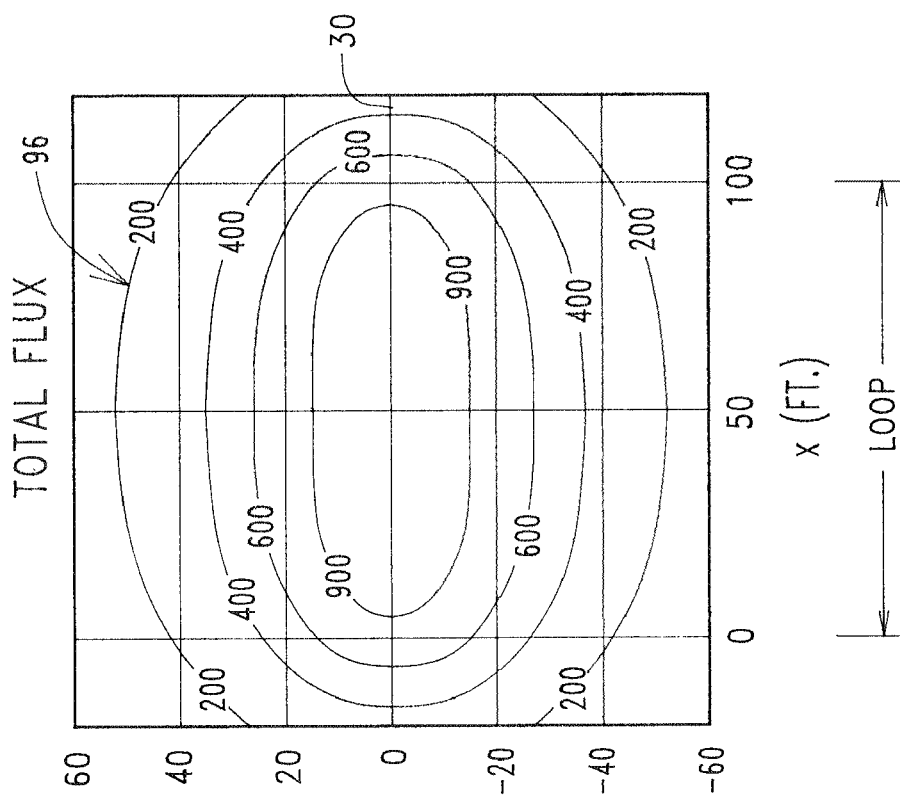
FIG. 11d is a contour plot of flux intensity induced by a single elongated planar current loop antenna at a plane parallel to the plane of the current loop, showing the total flux intensity.
Figure 11C:
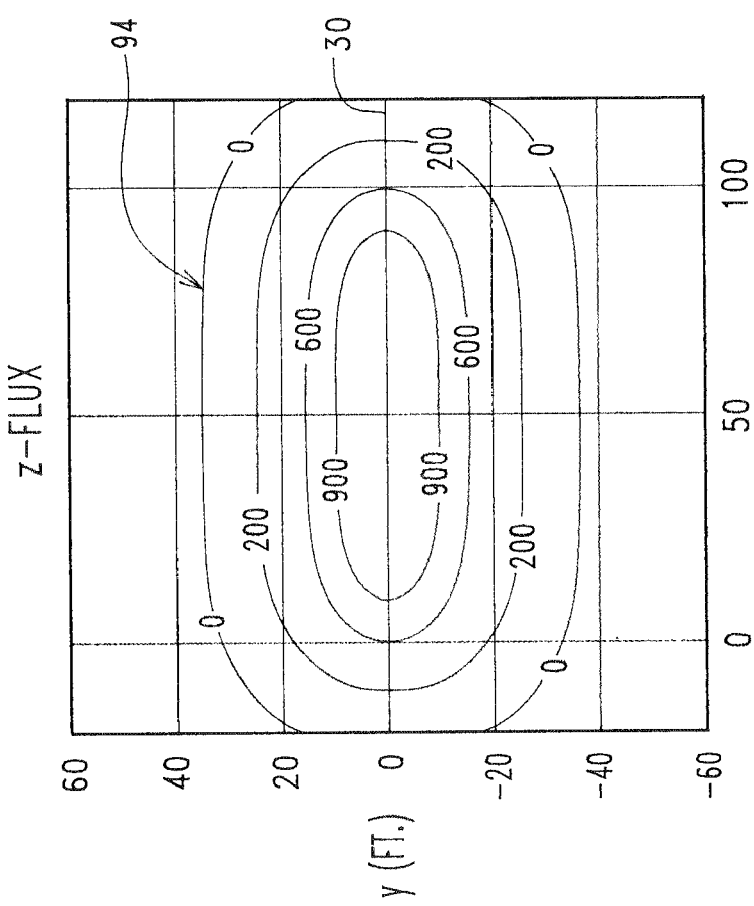
FIG. 11c is a contour plot of flux intensity induced by a single elongated planar current loop antenna at a plane parallel to the plane of the current loop, showing the flux intensity of a flux component in a vertical direction parallel to the z axis.

FIG. 11c illustrates a set of flux contour lines 94 showing the flux intensity in a vertical direction, parallel to the z axis. Again, contour lines 94 are generally straight above a centered section of loop antenna 28. These total flux contours also exhibit a generally straight characteristic above a centered section of elongated planar current loop 28.

FIG. 11d illustrates a set of flux contour lines 96 illustrating total flux intensity along the length of the elongation axis of planar current loop 28. These total flux contours also exhibit a generally straight characteristic above a centered section of elongated planar current loop 28 which comprises a considerable length of the overall current loop. With regard to FIGS. 11a-d, all of the numerical results illustrated have been independently validated in a bench-top experiment employing a multiple planar wire loop to generate the magnetic field and a single rod antenna for performing flux measurements.

Attention is now directed to calibration procedures appropriate for use with the elongated planar loop antenna of the present invention. Consistent with the foregoing descriptions, calibration will be discussed in the context of parallel boreholes. Accordingly, calibration is the process of determining transmitter strength (sometimes referred to as dipole constant or dipole strength, symbolized as "M") which can be done in a number of different ways. In a first exemplary calibration procedure, dipole strength is calculated from measured loop current, loop area, and from measurements of signal losses through pipe casing and outer wire meshes that may be present to assure sufficient pipe porosity.

Calibration may be performed during drilling as one advantage of the receiver of the present invention. As will be further described, receiver 24 of the present invention features two sets of flux reading devices installed a known distance apart with respect to the length of the receiver in the drill well so as to define a receiving axis that at least generally aligns with a centerline of the drill well.

Now considering specific details with regard to calibration, the dipole strength of a single loop formed by multiple filament wires can be calculated from:

$$M = k_{loss}\frac{\mu_o}{4\pi}n_{wire}i_{wire}A \qquad (7)$$

Here, $k_{loss}$ is a loss of signal strength caused by pipe casing and mesh cover, $\mu_0$ is the permeability of free space, $n_{wire}$ is the number of windings forming the elongated planar current loop, $i_{wire}$ is the current flowing in a single winding and A is the area of the current loop. The loss coefficient $k_{loss}$ must be obtained experimentally before drilling begins whereas the current flowing through each winding of the current loop is measured during drilling. It should be noted that an application of this formula does not require flux measurements during drilling in order to obtain dipole strength.

Equations (3) and (7) can be combined to provide equation 8 below to calculate the loss coefficient from measurements of radial distance, total flux and winding current in an above ground test. Data may be measured at a fixed radial distance such as, for example, 10 meters, and the accuracy of the resulting loss coefficient may be tested at other distances. One may also acquire data for a number of radial distances and calculate an average loss coefficient using this formula.

$$k_{loss} = \frac{4\pi R^2 B}{\mu_o n_{wire} i_{wire} A} \qquad (8)$$

Referring again to FIG. 1, an alternative calibration method will now be described. At the initiation of drilling, reference well 12 and drill well 14 are spaced apart at a known horizontal distance d. Moreover, in the initial, vertically oriented sections of the boreholes, loop transmitter 20 and receiver 24 are readily positionable at known depths to assure appropriate alignment for calibration purposes. Measurements taken by receiver 24 of total flux B in the drill well induced by the loop transmitter allows determination of its dipole strength using:

$$M=Bd^2 \qquad (9)$$

where equation 9 is a modified form of equation 3, with d (defined above) substituted for R and where M is the dipole strength and B is the total flux intensity. It should be noted that this calibration can only be done in borehole sections having a known positional relationship such as in the vertically oriented sections of FIG. 1. The known relationship may be acquired based on physical measurements prior to drilling, based on well surveys, logs or based on data developed during prior drilling, establishing the value for d and the physical profile of the boreholes. The technique requires the measurement of all components of flux. That is, measurements along three orthogonally oriented receiving axis to develop the total flux intensity. The loop transmitter can be inserted into the drill well at any roll angle since the measured total flux will be the same for all angular orientations, defined by angle $\phi$ in FIG. 9, as long as the distance d is unchanged.

Figure 12:
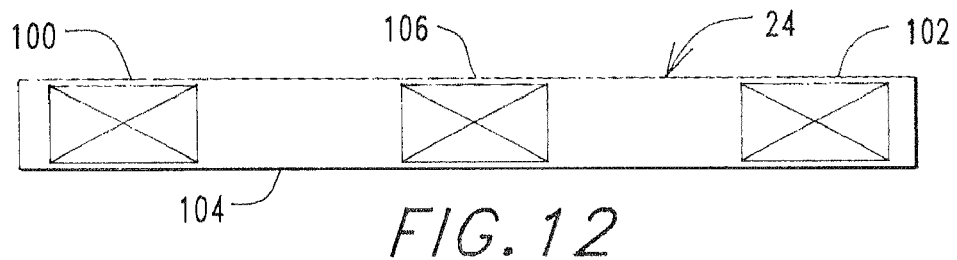
FIG. 12 is a diagrammatic plan view of a receiver implemented in accordance with the present invention, configured for insertion into a drill borehole and for proximally following a drill head within the drill borehole. The receiver includes first and second spaced-apart sensor clusters and another sensor section positioned therebetween.

Referring to FIGS. 1 and 12, receiver 24 of the present invention will now be described in further detail. Receiver 24 typically follows drill head 26 through the drill borehole, as depicted in FIG. 1. As mentioned above, the receiver is equipped with first and second spaced-apart clusters of sensors indicated by the reference numbers 100 and 102, respectively, positioned in a nonmagnetic housing 104. Sensor clusters 100 and 102 measure the magnetic field transmitted by loop transmitter 20 and may additionally measure the Earth's magnetic field. Each of these sensor clusters consists of one or more flux sensing devices such as, for example, magnetometers, loop or rod antennas, or any other suitable measurement device either known or yet to be developed. A first, triaxial magnetic field sensor is included in sensor cluster 100 while a second, at least monoaxial magnetic field sensor is included in sensor cluster 102 such that at least the horizontal component of flux is measured. This second magnetic field sensor is included at least for the purpose of determining yaw angle when the first, triaxial sensor is directly above the elongated current loop antenna and is only able to measure a vertical component of locating flux. In addition, receiver 24 houses pitch and roll sensors in a sensor section 106 which may include any number of accelerometers such as mechanical or fluid sensors. It is considered that one having ordinary skill in the art is capable of fabricating receiver 24 in a suitable form in view of this overall disclosure. Details with regard to the specific form of the receiver, as depicted in FIG. 12, are not intended to be limiting and modifications should be considered in view of the scope of the claims appended hereto.

Continuing with a description of receiver 24, data are either measured by the receiver's sensors continuously and then send to a data processing unit above ground or may be processed by a microprocessor within the receiver housing and transferred to an operator above ground, upon request. As described above, data transfer can be accomplished by wire link, electromagnetic link or conventional mud pulsing triggered by a signal from the surface such as the rate of mud flow or pulsing.

Referring to FIG. 1, in order to steer drill head 26 along a desired drill path, data is needed which may include:
  Drill head 26 roll and pitch angle, of which the latter may be measured by sensor section 106 shown in FIG. 12.
  Pitch angle (optional) of reference well 12 obtained from as-build records or from one or more pitch angle sensors within sensor packages of loop transmitter 20, as shown, for example in FIGS. 2 and 3.
  Roll angle measured by one or more loop transmitter 20 sensor packages including roll sensors for direct measurement. This roll measurement is not necessary if the orientation is established by some other means such as "pendulum" or weighted action in a self-leveling arrangement.
  A yaw angle difference between reference well 12 and drill well 14. This relative yaw angle depends on (i) pitch and roll angles of receiver 24 and planar loop transmitter 20 and (ii) transmitter flux measured by receiver 24 (FIG.

12) using a first triaxial magnetic field sensor and a second magnetic field sensor measuring at least one component of the magnetic field. This yaw angle can be calculated from equations 1-4 of the two-dimensional magnetic dipole field, taking the described loop end effects into account, or can also be obtained from a numerical evaluation of the law of Biot-Savart.

Vertical and horizontal offsets between receiver and loop transmitter in a plane normal to the axis or centerline of the reference well are obtained from receiver fluxes converted to a global coordinate system aligned with the reference well. It is noted that the elongated planar antenna of loop transmitter 20 is at least generally aligned with the centerline of the reference borehole when positioned therein.

As described above, sufficiently away from end segments of the elongated antenna transmitter the magnetic field is that of a two-dimensional dipole, as illustrated by numerical simulations described above with regard to FIGS. 9, 10 and 11a-11d. Measured fluxes may be transformed to a coordinate system fixed to the coplanar elongated current loop antenna so that equations given above may be solved in any plane generally perpendicular or transverse to the elongation axis of the antenna. This solution provides the receiver position in transmitter fixed coordinates that, in turn, are used to steer the drill head to the desired position.

Referring to FIG. 10, with regard to tracking based on equations 1-4, deriving equations for such tracking data is straightforward in view of this overall disclosure. It should be appreciated, however, that the equations contain two possible solutions, one above the plane of a horizontally oriented elongated loop antenna (above the y axis shown in FIG. 10) and the other solution below the antenna plane. This ambiguity is clearly seen in flux pattern 70 of the two-dimensional dipole. Moreover, the slope of the flux lines in the upper left quadrant of the figure is identical to that of the flux lines in the lower right quadrant. Of course, the same slope characteristic is applicable to the upper right and lower left quadrants. Hence, the flux pattern alone does not provide sufficient information to uniquely determine the relative position of drill well and reference well. For purposes of the remaining discussions, each quadrant may be referred to as a tracking region.

Referring to FIGS. 2-4, one useful way to resolve this ambiguity is to level the loop transmitter, as described above. Here, leveling refers to the leveling of a line perpendicular to long wire segments 33a and 33b of the loop transmitter, since the inclination of the longitudinal, elongated axis of the transmitter is defined by the reference well and can not be changed. Leveling can be accomplished, for example, by means of a passive device that employs transmitter weight and/or friction between transmitter support and the inside of the reference pipe casing. Another option is to actively level the loop transmitter, for example, using a motorized drive. Drill head tracking is then accomplished by keeping the drill head in the same tracking region either above or below the transmitter.

A generalization of the concept of actively controlling loop position is to change transmitter roll angle to always keep the receiver in the same tracking region, even for the most unusual movement of the drill head. Roll angle should be measured along the loop transmitter elongation axis and communicated to the control unit of the drive motor or other such positioning arrangement.

Still another approach for resolving the described tracking ambiguity is to rely on additional data to decide which of the two potential solutions to select. Examples include:

A solution based on the maximum possible vertical displacement obtained from measured receiver pitch and an estimate of longitudinal receiver position change. Assuming that loop transmitter and receiver are in upright positions the vertical receiver position change is estimated to be $$\Delta z = \Delta s \cdot \sin \Delta \phi \tag{10}$$

Here, $\Delta s$ denotes the longitudinal receiver position change and $\Delta \phi$ is the difference in pitch angles of transmitter loop and receiver. Since the symmetry of the flux pattern of a two-dimensional dipole, shown in FIG. 10, results in two possible solutions for the vertical position change $\Delta z$ the correct solution is the one closest to the result of equation 10.

A solution consistent with the most realistic drill rod deflections.

The use of sensitive fluxgate gradiometers would assist in differentiating between quadrants. One type of gradiometer utilizes two sensors spaced some distance apart of which the sensor closest to the center of the dipole will read the largest flux. This information, together with measured roll angles of transmitter loop and fluxgate gradiometer, in addition to measured magnetometer fluxes, is sufficient to determine the correct quadrant. Note that, in some instances, fluxgate gradiometers might have to be rolled for an accurate quadrant determination.

Pitch and yaw movements of the receiver unit will also indicate flux gradients and, in turn, identify quadrants.

These methods allow tracking of the drill head in all four quadrants of the flux pattern of FIG. 10. That is, a desired path may be followed with respect to the elongation axis of the elongated planar loop antenna having any desired configuration. For example, a desired path surrounding the antenna elongation axis may be defined, including, but not limited to a spiraling path. Accordingly, the present invention is highly advantageous with respect to the capability to define paths that are non-parallel with respect to the antenna elongation axis.

It should be appreciated that the approximated two-dimensional dipole field is highly effective when used in the manner described above. With regard to a more detailed consideration of its use, it is noted that a number of design features distinguish the actual loop transmitter signal from the mathematical abstract of a two-dimensional dipole. These include:

Longitudinal loop curvature
Loop end segments
Distance between longitudinal (elongated) wire segments
Loop length (aspect ratio)

A uniform approach may be used to account for all of these effects. Based on numerical simulations and analytical approximations of the main effect of each of the listed features, the present invention contemplates the development of corrections of the two-dimensional dipole field, where needed. Such an analysis was applied in the development of FIGS. 11a-d, illustrating flux contours. As another example, the effect of a finite distance between two parallel longitudinal wires can be accounted for by applying the law of Biot Savart separately to each infinitely long wire. The present invention contemplates the application of standard references in electromagnetics in resolving all such effects. Accordingly, the resolution of these effects is considered as within the capability of one having ordinary skill in the art in view of this overall disclosure.

Having previously drawn a comparison to the Kuckes patents, the Coyne patents will now be addressed briefly. The present invention is considered to provide a sweeping improvement over the Coyne patents. Specifically, the need to use a complex locating signal characterized by a rotating flux vector is avoided. The locating signal transmitted by single loop planar antenna 28 of FIG. 2 is considered as a basic form of the present invention and this locating signal is denoted as a "monotone single phase magnetic field." That is, this signal is transmitted at a single frequency and with only one phase. Accordingly, the present invention, in its basic form, relies on intensity measurements of the locating signal, eliminating the need to establish phase information, such as is introduced by reliance of the Coyne patents on a rotating flux vector. As another distinction with regard to the Coyne patents, it is submitted that the dipole-quadrupole antenna used therein would introduce undue difficulties with respect to the proposition of inserting this antenna into a borehole. The relatively simple form of the elongated planar loop antenna of the present invention, on the other hand, is considered to be essentially immune to any effects encountered as a result of insertion into a borehole.

Attention is now directed to details with regard to relative position determination. In the present example, relative position determination will be discussed in the context of reference and drill wells. Of course, this context is not intended as being limited in any way and it is considered that one of ordinary skill in the art may adapt the disclosed procedures to many other applications in view of this overall disclosure. Relative position variables which may be determined include the shortest distance between the two wells, lateral and vertical offsets and the difference in yaw angle.

Figure 13:
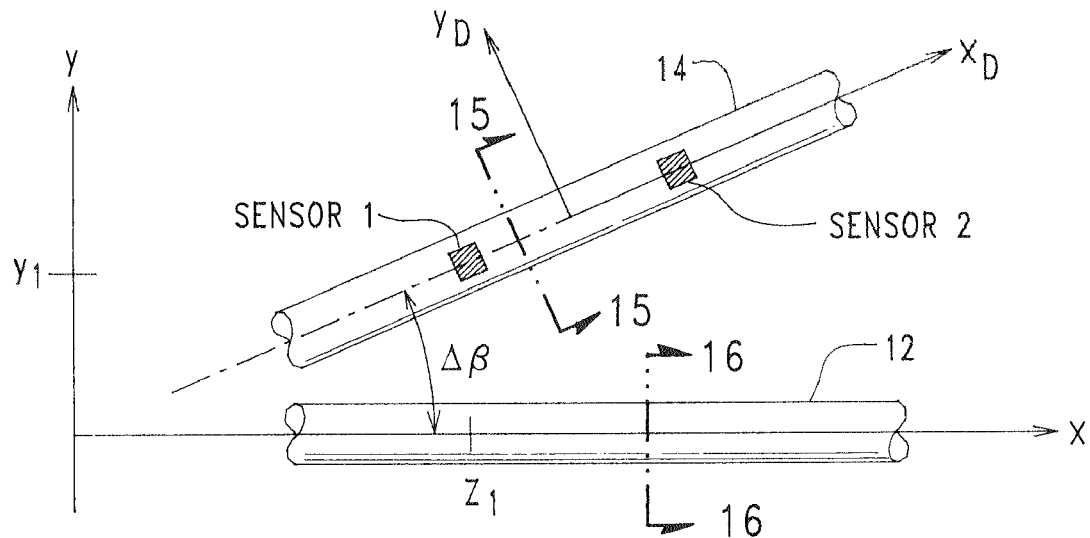
FIG. 13 is a diagrammatic plan view illustrating sections of a reference well and a drill well having first and second sensors positioned herein, shown here to illustrate certain orientation axes and variables including an overall Cartesian coordinate system.

Referring now to FIG. 13, which is a diagrammatic plan view illustrating sections of reference well 12 and drill well 14, inputs that are utilized include pitch angles and roll angles of the receiver assembly and transmitter to be further described, as well as the components of flux measured by two receiver sensors in drill well 14, which are indicated as Sensor 1 and Sensor 2. Locating processes may be developed based either on the two-dimensional dipole equations or the law of Biot-Savart, each of which will be further described. The former approach is an application of the well-known dipole equations and is therefore computationally very efficient. The latter method may be applied to any of the transmitter configurations described in this disclosure, but is possibly more computing intensive. Application of the law of Biot-Savart requires the position of Sensor 1 along the axis of the reference well as an additional input. The latter can be measured, for example, by monitoring the loop transmitter movement and magnetic signal spikes emitted by end current loops.

Figure 14:
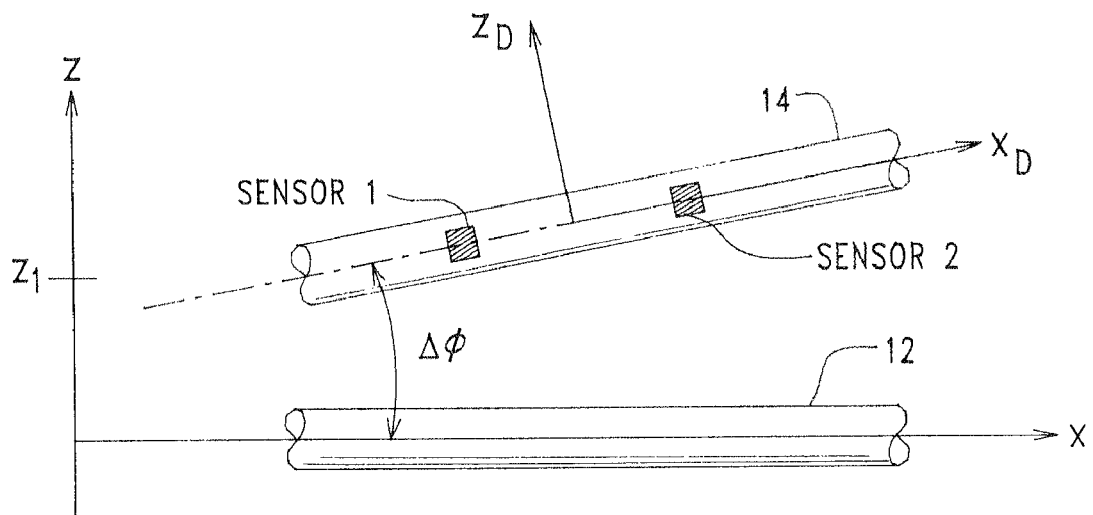
FIG. 14 is a diagrammatic view illustrating the well sections of FIG. 13 in elevation, shown here to illustrate further orientation axes and variables.

Referring to FIGS. 13 and 14, the latter is an elevational view illustrating sections of reference well 12 and drill well 14 corresponding to the view of FIG. 13. An overall Cartesian coordinate system, which may be referred to as a reference well coordinate system, includes x, y, z axes, as illustrated, in which the x axis is coincident with the axis of the reference well and the y axis is horizontally oriented. An $x_D$, $y_D$, $z_D$ drill well coordinate system is shown in which the $y_D$ axis is horizontally oriented (see FIGS. 13 and 14).

Figure 15:
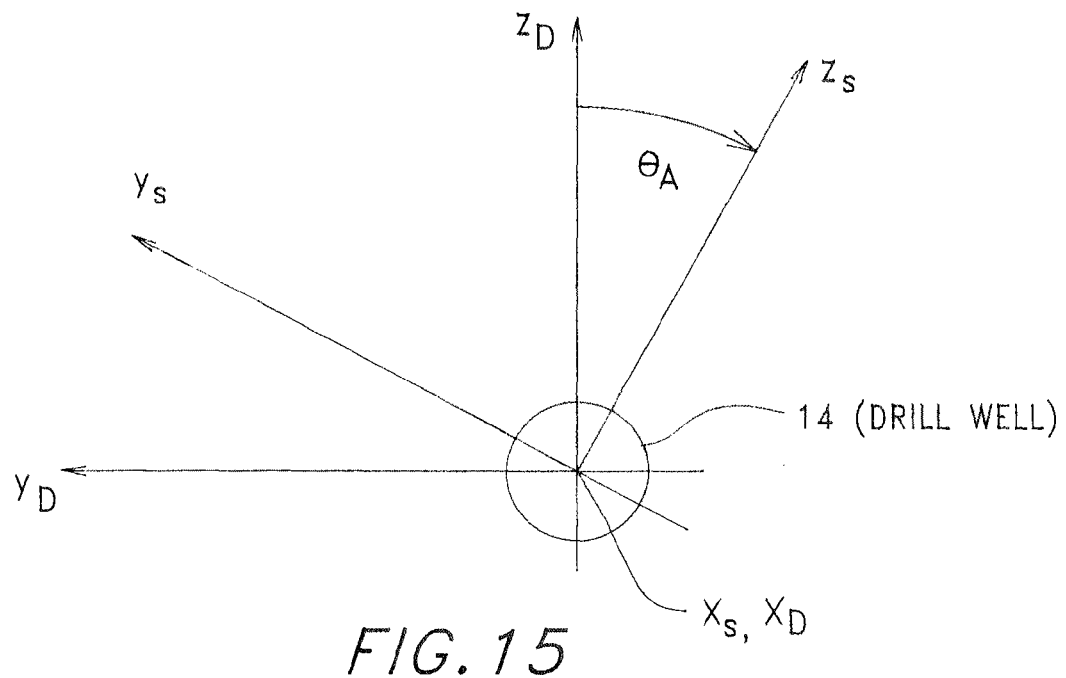
FIG. 15 is a diagrammatic cross-sectional view, in elevation, taken along a line 15-15 shown in FIG. 13 extending through the drill well, illustrating details of a sensor coordinate system forming part of the overall coordinate system.

Referring to FIG. 15, the coordinate systems further include a $x_S$, $y_S$, $z_S$ sensor coordinate system which rotates with the receiver assembly in drill well 14. The $x_S$ and $x_D$ axes are normal to the plane of the figure at the intersection of the $y_S$ and $z_S$ axes.

Figure 16:
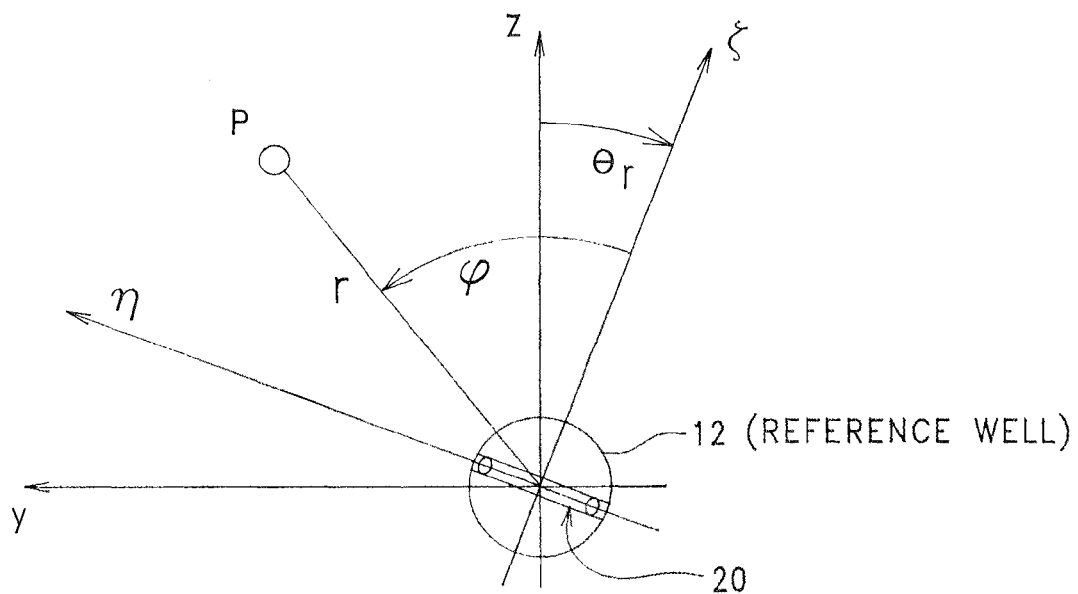
FIG. 16 is a diagrammatic cross-sectional view, in elevation, taken along a line 16-16 also shown in FIG. 13 extending through the reference well, illustrating details of a transmitter coordinate system forming part of the overall coordinate system.

A transmitter coordinate system forms part of the coordinate systems, illustrated in FIG. 16 and including $\xi$, $\eta$, $\zeta$ Cartesian axes which roll with loop transmitter 20 in reference well 12, as well as r, $\phi$ polar coordinates which also roll with the transmitter. Measured variables relied on by this procedure include:

$\Delta\phi$ pitch angle difference between reference and drill well (FIG. 14)

$\theta_A$ roll angle of receiver assembly (FIG. 15)

$\theta_T$ roll angle of loop transmitter (FIG. 16)

$b_{x_S}$, $b_{y_S}$, $b_{z_S}$ flux components for unit dipole strength in sensor coordinates at Sensors 1 and 2 (corresponding axes shown in FIG. 15)

$x_1$ x-location of sensor 1 in reference well coordinates

Unknown variables include:

$\Delta\beta$ yaw angle difference between drill and reference wells (FIG. 13)

$y_1$, $z_1$ horizontal and vertical offset of drill well at Sensor 1 in reference well coordinates (FIG. 13)

r distance from Sensor 1 normal to axis of reference well 12 (FIG. 16)

Having described the coordinate system arrangement, it is noted that a number of the equations appearing below are written in symbolic notation wherein a function $f_i$ (i=1, 2, 3) indicates a coordinate transformation between two of the coordinate systems defined above.

As a first step in determining the relative positions of the two wells, fluxes at Sensors 1 and 2 are transformed from sensor coordinates $x_S$, $y_S$, $z_S$ (FIG. 15) to drill well coordinates (see FIGS. 13 and 14) using $$(b_{x_D}, b_{y_D}, b_{z_D}) = f_1(b_{x_S}, b_{y_S}, b_{z_S}, \theta_A) \quad (11)$$

In order to transform Sensor 2 fluxes, it is assumed that all three flux components are available. Since the dipole field is assumed to be two-dimensional for which $b_x=0$, difference, $\Delta\beta$, between drill and reference well yaw angles becomes $$\tan(\Delta\beta) = \frac{\cos(\Delta\phi) b_{x_D} - \sin(\Delta\phi) b_{z_D}}{b_{y_D}} \quad (12)$$

Here, $\Delta\beta$ is calculated using either Sensor 1 or Sensor 2 data. As long as at least one of equations 13 and 14, immediately below, is satisfied:

$$b_{y_D} \neq 0, \text{ or} \quad (13)$$

$$\tan(\Delta\phi) \neq \frac{b_{x_D}}{b_{z_D}} \quad (14)$$

Sensor 1 data may be used to calculate $\Delta\beta$ otherwise the feasibility of utilizing data from Sensor 2 is tested. If, subsequently, neither equation (13) nor equation (14) is satisfied by Sensor 2 fluxes, the yaw angle difference between drill well and reference well is set to zero.

Knowing the yaw angle change, $\Delta\beta$, measured fluxes are now transformed from drill well, $x_D$, $y_D$, $z_D$, to Cartesian transmitter coordinates, $\xi$, $\eta$, $\zeta$, using:

$$(b_\eta_1, b_\zeta_1) = f_2(b_{x_D}, b_{y_D}, b_{z_D}, \Delta\phi, \Delta\beta, \theta_T) \quad (15)$$

At this point of the analysis, the dipole equations are introduced to obtain the Sensor 1 position ($\eta_1$, $\zeta_1$) in Cartesian transmitter coordinates using:

$$r = \frac{1}{(b_{x_s}^2 + b_{y_s}^2 + b_{z_s}^2)^{\frac{1}{4}}} \quad (16)$$

$$\tan(2\varphi) = \frac{b_{\eta_1}}{b_{\zeta_1}} \quad (17)$$

$$\eta_1 = r\sin\varphi \quad (18)$$

$$\zeta_1 = r\cos\varphi. \quad (19)$$

Offsets between drill well 14 at the Sensor 1 location and reference well 12 follow from:

$$(y_1, z_1) = f_3(\eta_1, \zeta_1, \theta_T) \quad (20)$$

where $y_1$ and $z_1$ are shown in FIGS. 13 and 14.

A different algorithm is applied if Sensor 1 is located directly above the loop transmitter (viewed in the normal direction) and Sensor 2 only measures the flux in the $y_s$ direction. Assuming the receiver which houses the flux sensors as well as the loop transmitter are at 12 o'clock roll positions (zero roll angle) and have the same pitch, the vertical offset between Sensor 1 and the plane containing the loop transmitter can be determined from the flux measurements at this sensor using equation 16. Based on above assumptions concerning relative roll and pitch, the vertical offsets between Sensors 1 and 2 and the loop transmitter have the same value. Consequently, the lateral offset of Sensor 2 becomes a function of its measured flux and known vertical offset. Yaw angle difference between drill well and reference well can then be calculated from the lateral offset of Sensor 2 and its known distance to Sensor 1.

Using the coordinate system described with regard to FIGS. 13-16 along with variables defined therein, unless otherwise noted, application of the law of Biot-Savart will now be described for use in relative position determination. Fundamentally, this approach calculates fluxes at the location of Sensor 1 by employing the law of Biot-Savart and matches these fluxes to the measured fluxes. One implementation of this approach defines a function:

$$F(\Delta\beta, y_1, z_1) = W_x(f_{x_s} - b_{x_S})^2 + W_y(f_{y_s} - b_{y_S})^2 + W_z(f_{z_s} - b_{z_S})^2 \quad (21)$$

Equation 21 depends on the three unknowns $\Delta\beta$, $y_1$, $z_1$ since calculated fluxes $f_{x_s}$, $f_{y_s}$, $f_{z_s}$ are functions of these unknown variables. Measured fluxes $b_{x_s}$, $b_{y_s}$, $b_{z_s}$ are considered constant during the solution. Here, the symbols $W_x$, $W_y$, $W_z$ represent weighting functions. Matching calculated to measured fluxes is achieved by minimizing function F in an iterative procedure starting with initial estimations of $\Delta\beta$, $y_1$, $z_1$ and a measured value for $x_1$. The function minimization may be carried out using standard numerical techniques such as the SIMPLEX method (see also U.S. Pat. No. 6,047,783 entitled SYSTEMS, ARRANGEMENTS AND ASSOCIATED METHODS FOR TRACKING AND/OR GUIDING AN UNDERGROUND BORING TOOL, which is co-assigned with the present application and is incorporated herein by reference).

Another technique in solving for unknown position parameters $\Delta\eta$, $y_1$, $z_1$ uses an equation for each flux that is to be matched:

$$b_{x_1} = f_{x_1}(\Delta\beta, y_1, z_1) \quad (22)$$

$$b_{y_1} = f_{y_1}(\Delta\beta, y_1, z_1) \quad (23)$$

$$b_{z_1} = f_{z_1}(\Delta\beta, y_1, z_1) \quad (24)$$

Equations 22-24 may be solved simultaneously by employing a number of standard solution methods such as, for example, the well-known Newton method.

Figure 17:
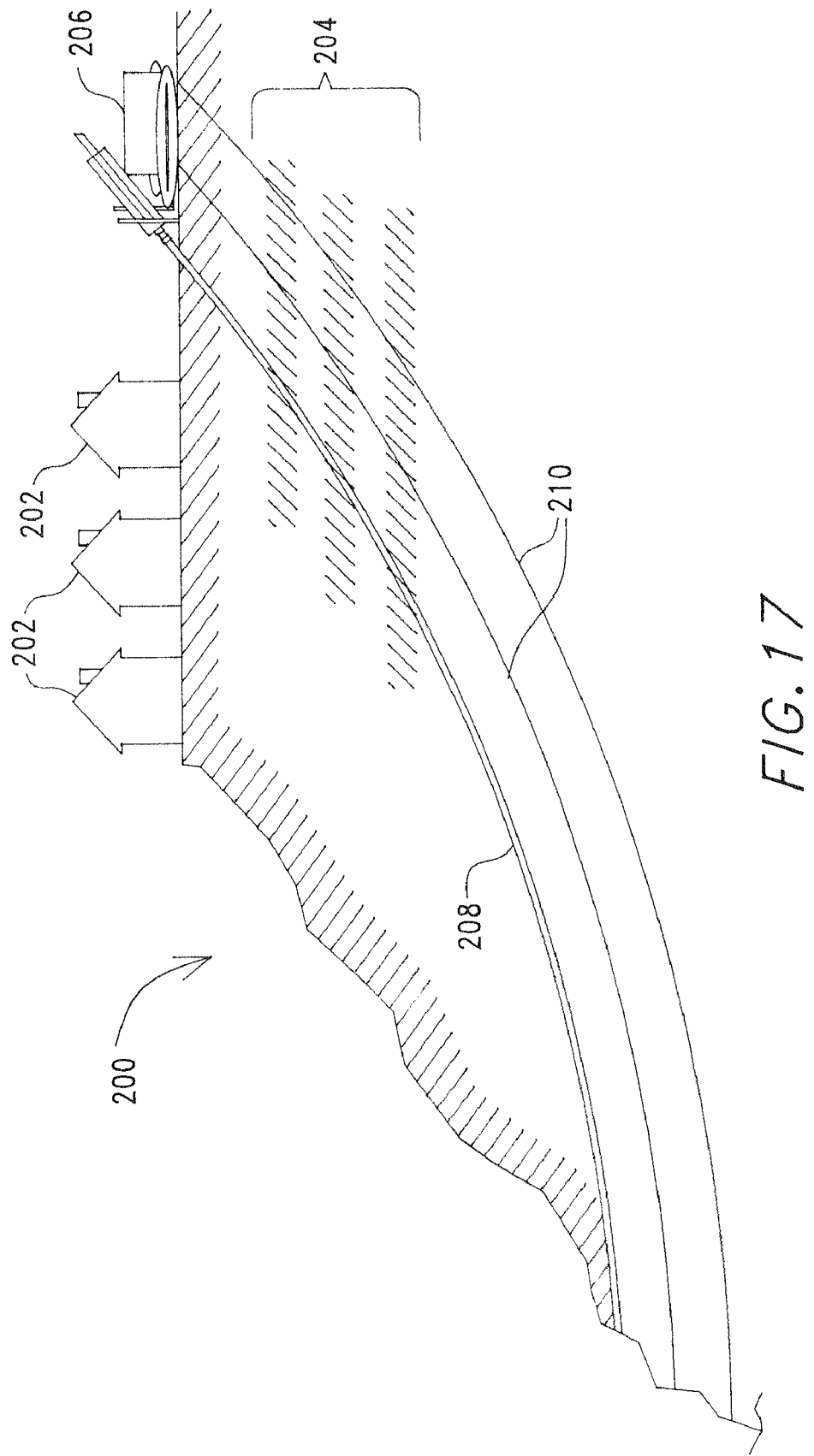
FIG. 17 is a diagrammatic view, in elevation, of a locating and steering apparatus of the present invention in another implementation for forming boreholes that are parallel to a path such as is defined here by a preexisting borehole in an exemplary hillside stabilization application.

Inasmuch as the arrangements and associated methods disclosed herein may be provided in a variety of different configurations and modified in an unlimited number of different ways, it should be understood that the present invention may be embodied in many other specific forms without departing from the spirit or scope of the invention. For example, FIG. 17 illustrates an alternative application using the present invention in a highly advantageous way for the purpose of hill slope stabilization in a region that is generally indicated by the reference number 200. This procedure might become necessary to save houses 202 or roadways (not shown) that are built above water bearing soil layers 204. Parallel boreholes are formed by using a drill rig 206 shown forming an initial borehole 208 so as to pass through water bearing layers 204. Offset parallel boreholes are then drilled in positions indicated by solid lines 210 and in accordance with the present invention, drilled through water bearing layers 204 to improve drainage, thereby preventing slides. As a further example (not shown), construction of traffic tunnels in soft earth often requires the drilling of parallel boreholes. Prior to excavation of a tunnel, the boreholes must be accurately drilled and filled with reinforced concrete to stabilize the earth. Therefore, the present examples and methods are to be considered as illustrative and not restrictive, and the invention is not to be limited to the details given herein, but may be modified within the scope of the appended claims.

What is claimed is:

1. A system for position determination, comprising:
a transmitter including an elongated planar loop antenna having a current loop defining an elongation axis with a length along the elongation axis which is greater than a width of the current loop for positioning the elongation axis of said antenna along at least a portion of a path and configured for generating a monotone single phase magnetic field from the current loop of the antenna;
a receiver that is configured to determine certain characteristics of the magnetic field at a receiving position that is radially displaced from the antenna elongation axis; and
a processor that is configured to use the determined certain characteristics to establish at least one of a radial offset and an angular orientation between the receiving position and the antenna on the path.

2. The system of claim 1 wherein said transmitter is configured for operation within a borehole.

3. An apparatus comprising:
a transmitter including an elongated planar loop antenna having a current loop including a pair of end segments with a length therebetween, along which length an elongation axis is formed and which length is greater than said inner diameter of a reference borehole and at least said elongated planar loop antenna being configured for insertion into the reference borehole to at least generally align the elongation axis along at least a portion of the reference borehole for generating a magnetic field from the current loop of the antenna;
a receiver that is configured to measure certain characteristics of the magnetic field at a receiving position that is radially displaced from the reference borehole; and
a processor that is configured to use the measured certain characteristics to determine at least one of a radial offset and an angular orientation between the receiving position and the antenna elongation axis of the antenna in the reference borehole.

4. The apparatus of claim 3 wherein the length of said current loop is at least approximately fifty times the inner diameter of the reference borehole.

5. The apparatus of claim 3 wherein the length of said current loop is greater than the radial offset between the reference borehole and the receiving position.

6. The apparatus of claim 3 wherein said transmitter further includes an arrangement for self-leveling the planar loop antenna that is intended to maintain said current loop in a generally horizontal plane.

7. The apparatus of claim 3 wherein insertion of the transmitter into the reference borehole thereafter permits roll of the planar loop antenna about said elongation axis and said transmitter further includes at least one roll sensor for sensing roll of said planar loop antenna for use in communicating antenna roll data from said transmitter.

8. The apparatus of claim 7 wherein said transmitter includes a plurality of roll sensors positioned at spaced-apart locations along the length of said current loop and proximate to the elongation axis.

9. The apparatus of claim 3 wherein said transmitter includes at least one pitch sensor arranged proximate to the elongation axis of the current loop.

10. The apparatus of claim 3 wherein the current loop includes a twist along its length defining a roll angle difference between said end segments that is less than a full circle and the transmitter includes a roll sensor arrangement for detecting said roll angle difference using at least one roll sensor and said processor uses the detected roll angle difference as an additional characteristic in determining at least one of the radial offset and the angular orientation.

11. An apparatus for location determination comprising:
a transmitter including an antenna having a current loop with a pair of opposing end segments defining a length therebetween to form an elongation axis for positioning the elongation axis along at least a portion of a path, said current loop having a twist formed along its length with a roll angle difference between said end segments, which twist is less than a full circle for generating a magnetic field from the current loop;
an arrangement that is configured to detect the roll angle difference using at least one roll sensor positioned to roll with at least a portion of the current loop;
a receiver that is configured to determine certain characteristics of the magnetic field at a receiving position radially displaced from the antenna elongation axis; and
a processor that is configured to use the determined certain characteristics and the detected roll angle difference to establish at least one of a radial offset and an angular orientation between the receiving position and the antenna on the path.

12. The apparatus of claim 11 wherein said transmitter generates the magnetic field as a monotone single phase magnetic signal from the current loop.

* * * * *